(12) United States Patent
Saisho

(10) Patent No.: US 10,852,818 B2
(45) Date of Patent: Dec. 1, 2020

(54) INFORMATION PROVISION DEVICE AND INFORMATION PROVISION METHOD

(71) Applicant: Kenichiroh Saisho, Tokyo (JP)

(72) Inventor: Kenichiroh Saisho, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/213,889

(22) Filed: Dec. 7, 2018

(65) Prior Publication Data

US 2019/0107886 A1 Apr. 11, 2019

Related U.S. Application Data

(63) Continuation of application No. 14/955,402, filed on Dec. 1, 2015, now Pat. No. 10,152,120.

(30) Foreign Application Priority Data

Dec. 10, 2014 (JP) .................................. 2014-250084

(51) Int. Cl.
*G06F 3/01* (2006.01)
*G01C 21/36* (2006.01)
(Continued)

(52) U.S. Cl.
CPC .............. *G06F 3/013* (2013.01); *B60K 35/00* (2013.01); *B60R 1/00* (2013.01); *G01C 21/365* (2013.01);
(Continued)

(58) Field of Classification Search
CPC ............................ G06F 3/013; G01C 21/3635
See application file for complete search history.

(56) References Cited

U.S. PATENT DOCUMENTS 5,510,983 A * 4/1996 Iino ........................ B60K 35/00
340/441
5,519,536 A * 5/1996 Hoehn ................... B60K 35/00
359/630
(Continued)

FOREIGN PATENT DOCUMENTS

JP 2009-006968 1/2009
JP 2009-067368 4/2009
(Continued)

OTHER PUBLICATIONS

U.S. Appl. No. 13/721,099, filed Dec. 20, 2012.
(Continued)

*Primary Examiner* — Nitin Patel
*Assistant Examiner* — Robert M Stone
(74) *Attorney, Agent, or Firm* — Oblon, McClelland, Maier & Neustadt, L.L.P.

(57) ABSTRACT

An information provision device and an information provision method. Each of the information provision device and information provision method includes projecting an image light to a light transmission member so as to display a for-driver information image, sensing a relative distance of an object to be detected existing around the mobile object in the direction of travel, detecting a location of a viewpoint of the driver, and changing a position at which an object image indicating the object to be detected is displayed according to a result of the detecting so as to change a perception distance of the driver influenced by a motion parallax of the object image according to the relative distance of the object to be detected in the direction of travel.

14 Claims, 10 Drawing Sheets

(51) Int. Cl.
*B60K 35/00* (2006.01)
*B60R 1/00* (2006.01)
*G02B 27/01* (2006.01)

(52) U.S. Cl.
CPC ..... *G01C 21/3632* (2013.01); *G01C 21/3635* (2013.01); *G01C 21/3697* (2013.01); *B60K 2370/149* (2019.05); *B60K 2370/1529* (2019.05); *B60K 2370/1531* (2019.05); *B60K 2370/166* (2019.05); *B60K 2370/167* (2019.05); *B60K 2370/177* (2019.05); *B60K 2370/179* (2019.05); *B60K 2370/186* (2019.05); *B60K 2370/193* (2019.05); *B60K 2370/194* (2019.05); *B60K 2370/21* (2019.05); *B60K 2370/333* (2019.05); *B60K 2370/334* (2019.05); *B60K 2370/349* (2019.05); *B60K 2370/48* (2019.05); *B60K 2370/52* (2019.05); *B60K 2370/66* (2019.05); *B60K 2370/785* (2019.05); *B60R 2300/107* (2013.01); *B60R 2300/205* (2013.01); *B60R 2300/301* (2013.01); *B60R 2300/308* (2013.01); *B60R 2300/605* (2013.01); *B60R 2300/8093* (2013.01); *G02B 2027/0185* (2013.01); *G02B 2027/0187* (2013.01)

(56) References Cited

U.S. PATENT DOCUMENTS

| | | | | |
|---|---|---|---|---|
| 7,561,966 | B2 * | 7/2009 | Nakamura | G01C 21/365 340/461 |
| 7,815,313 | B2 * | 10/2010 | Ito | B60R 1/00 353/13 |
| 8,049,609 | B2 * | 11/2011 | Takahashi | B60Q 3/78 340/461 |
| 8,098,171 | B1 * | 1/2012 | Szczerba | G08G 1/166 340/905 |
| 8,212,662 | B2 * | 7/2012 | Sasaki | G01B 21/22 340/438 |
| 8,693,103 | B2 * | 4/2014 | Sasaki | G02B 27/0101 359/630 |
| 9,047,703 | B2 * | 6/2015 | Beckwith | G06T 15/08 |
| 9,135,754 | B2 * | 9/2015 | Ng-Thow-Hing | B60R 1/00 |
| 9,607,510 | B1 * | 3/2017 | DeLorean | G06Q 30/0241 |
| 9,933,692 | B2 * | 4/2018 | Watanabe | G02B 27/0149 |
| 10,242,608 | B2 * | 3/2019 | Tanaka | G06K 9/00818 |
| 2006/0187294 | A1 | 8/2006 | Saisho et al. | |
| 2006/0284968 | A1 | 12/2006 | Hayashi et al. | |
| 2007/0211326 | A1 | 9/2007 | Saisho et al. | |
| 2008/0068689 | A1 | 3/2008 | Saisho et al. | |
| 2008/0068693 | A1 | 3/2008 | Hayashi et al. | |
| 2008/0218827 | A1 | 9/2008 | Watanabe et al. | |
| 2009/0005961 | A1 * | 1/2009 | Grabowski | G02B 27/01 701/532 |
| 2009/0058979 | A1 | 3/2009 | Saisho et al. | |
| 2009/0059337 | A1 | 3/2009 | Saisho | |
| 2009/0160736 | A1 * | 6/2009 | Shikita | G02B 27/0101 345/7 |
| 2009/0187343 | A1 * | 7/2009 | Koch-Groeber | B60K 35/00 701/301 |
| 2009/0237803 | A1 * | 9/2009 | Hotta | G02B 3/005 359/630 |
| 2009/0243963 | A1 * | 10/2009 | Hotta | G02B 27/0093 345/7 |
| 2010/0066832 | A1 * | 3/2010 | Nagahara | G02B 7/1822 348/148 |
| 2010/0073636 | A1 | 3/2010 | Sasaki et al. | |
| 2010/0157430 | A1 * | 6/2010 | Hotta | G02B 27/01 359/630 |
| 2010/0164702 | A1 * | 7/2010 | Sasaki | G01B 21/22 340/438 |
| 2010/0253489 | A1 * | 10/2010 | Cui | G01S 13/867 340/425.5 |
| 2010/0253594 | A1 * | 10/2010 | Szczerba | G08G 1/165 345/7 |
| 2010/0253688 | A1 * | 10/2010 | Cui | G02B 27/01 345/443 |
| 2010/0253918 | A1 | 10/2010 | Seder | |
| 2010/0328417 | A1 | 12/2010 | Saisho et al. | |
| 2011/0001639 | A1 * | 1/2011 | Sasaki | G02B 27/0101 340/995.19 |
| 2011/0002025 | A1 | 1/2011 | Tokita et al. | |
| 2011/0052042 | A1 * | 3/2011 | Ben Tzvi | G06T 19/006 382/154 |
| 2011/0128139 | A1 * | 6/2011 | Tauchi | B60Q 9/008 340/439 |
| 2011/0235132 | A1 | 9/2011 | Saisho et al. | |
| 2011/0316959 | A1 | 12/2011 | Saisho et al. | |
| 2012/0098820 | A1 * | 4/2012 | Said | G06F 3/012 345/419 |
| 2012/0127184 | A1 | 5/2012 | Satoh et al. | |
| 2012/0224062 | A1 * | 9/2012 | Lacoste | G02B 27/01 348/148 |
| 2012/0268351 | A1 * | 10/2012 | Sasaki | G01C 21/365 345/8 |
| 2013/0063754 | A1 | 3/2013 | Saisho et al. | |
| 2013/0076787 | A1 * | 3/2013 | Mathieu | B60R 1/00 345/633 |
| 2013/0293582 | A1 * | 11/2013 | Ng-Thow-Hing | G06T 7/73 345/633 |
| 2014/0267398 | A1 * | 9/2014 | Beckwith | G08G 1/166 345/633 |
| 2014/0268353 | A1 * | 9/2014 | Fujimura | G02B 27/01 359/630 |
| 2015/0198456 | A1 * | 7/2015 | Ishikawa | G09B 29/106 701/437 |
| 2016/0003636 | A1 * | 1/2016 | Ng-Thow-Hing | G08G 1/167 701/26 |
| 2016/0004076 | A1 | 1/2016 | Matsubara et al. | |
| 2016/0018889 | A1 * | 1/2016 | Skogo | G06K 9/00604 348/78 |
| 2016/0313562 | A1 * | 10/2016 | Saisho | G02B 27/0179 |
| 2016/0327402 | A1 * | 11/2016 | Funabiki | G01C 21/365 |
| 2017/0146803 | A1 * | 5/2017 | Kishigami | H04N 9/3167 |
| 2017/0176744 | A1 * | 6/2017 | El-Ghoroury | G02B 5/10 |
| 2017/0315352 | A1 * | 11/2017 | Hardy | G02B 27/0101 |

FOREIGN PATENT DOCUMENTS

| | | |
|---|---|---|
| JP | 2009-150947 | 7/2009 |
| JP | 2009-196630 | 9/2009 |
| JP | 2010-072455 | 4/2010 |
| JP | 2010-143520 | 7/2010 |
| JP | 2 472 773 A | 2/2011 |
| JP | 2011-059270 | 3/2011 |
| JP | 2011-064760 | 3/2011 |
| JP | 2011-073466 | 4/2011 |
| JP | 2014-74818 | 4/2014 |
| WO | WO 2014/129017 A1 | 8/2014 |

OTHER PUBLICATIONS

Extended European Search Report dated Apr. 19, 2016 in European Patent Application No. 15195457.5.
Japanese Office Action dated Sep. 14, 2018 in Japanese Patent Application No. 2014-250084, 3 pages.

* cited by examiner

INFORMATION PROVISION DEVICE AND INFORMATION PROVISION METHOD

CROSS-REFERENCE TO RELATED APPLICATION

This patent application is a continuation of U.S. patent application Ser. No. 14/955,402, filed Dec. 1, 2015, which is based on and claims priority pursuant to 35 U.S.C. § 119(a) to Japanese Patent Application No. 2014-250084, filed on Dec. 10, 2014, in the Japan Patent Office, the entire disclosure of which is hereby incorporated by reference herein.

BACKGROUND

Technical Field

Embodiments of the present invention relate to an information provision device and an information provision method.

Background Art

An information provision device for which a heads-up display (HUD) or the like is provided is known in the art, and such a HUD projects an image to provide information to the driver of a mobile object such as a vehicle, ship, aircraft, and a steel-collar worker (robot).

SUMMARY

Embodiments of the present invention described herein provide an information provision device, an information provision method, and a computer-readable non-transitory recording medium storing a program for causing a computer of the information provision device to execute an information-provision control method. Each of the information provision device and information provision method includes projecting an image light to a light transmission member so as to display a for-driver information image indicating for-driver information to be provided for a driver of a mobile object in a prescribed display area that is visually recognized by the driver through the light transmission member ahead of the mobile object in a direction of travel, thereby providing the for-driver information to the driver, sensing a relative distance of an object to be detected existing around the mobile object in the direction of travel, detecting a location of a viewpoint of the driver, and changing a position at which an object image indicating the object to be detected is displayed according to a result of the detecting so as to change a perception distance of the driver influenced by a motion parallax of the object image according to the relative distance of the object to be detected in the direction of travel. The information-provision control method includes controlling the image-light projection device by changing a position at which an object image indicating the object to be detected is displayed according to a result of detection generated by the viewpoint detector so as to change a perception distance of the driver influenced by a motion parallax of the object image according to the relative distance of the object to be detected in the direction of travel.

BRIEF DESCRIPTION OF THE DRAWINGS

A more complete appreciation of exemplary embodiments and the many attendant advantages thereof will be readily obtained as the same becomes better understood by reference to the following detailed description when considered in connection with the accompanying drawings.

Figure 1:
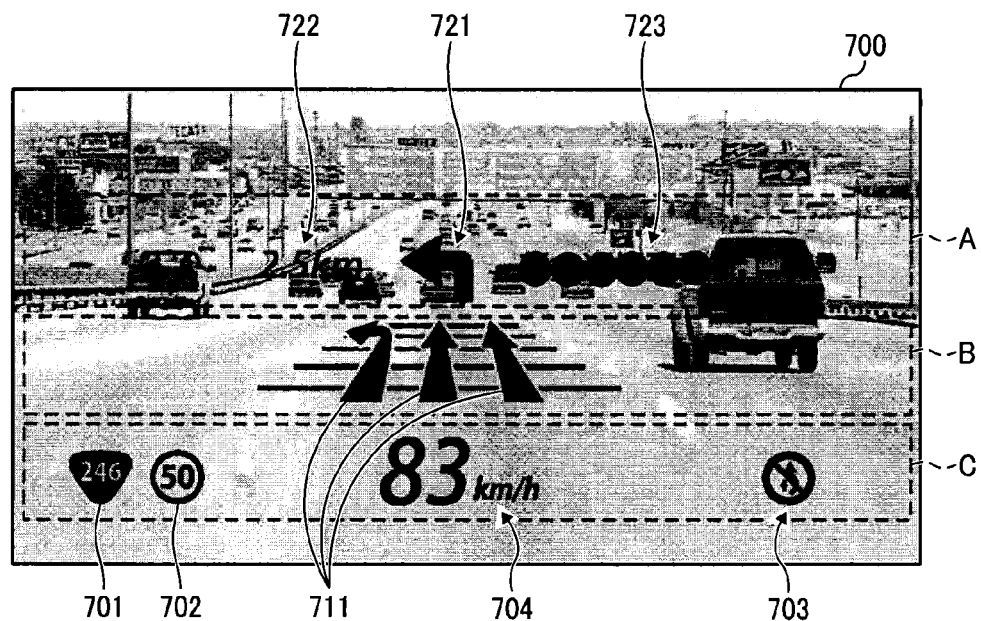
FIG. 1 is a schematic diagram of an example virtual image displayed in a display area over the sight ahead of the vehicle viewed by a driver through the front windshield, according to an embodiment of the present invention.

The accompanying drawings are intended to depict exemplary embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that have the same structure, operate in a similar manner, and achieve a similar result.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware at existing network elements or control nodes. Such existing hardware may include one or more central processing units (CPUs), digital signal processors (DSPs), application-specific-integrated-circuits (ASICs), field programmable gate arrays (FPGAs), computers or the like. These terms in general may be collectively referred to as processors.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

An information provision system for a driver, which serves as an information provision device, to which an on-vehicle heads-up display (HUD) according to an embodiment of the present invention is applied, is described.

Figure 2:
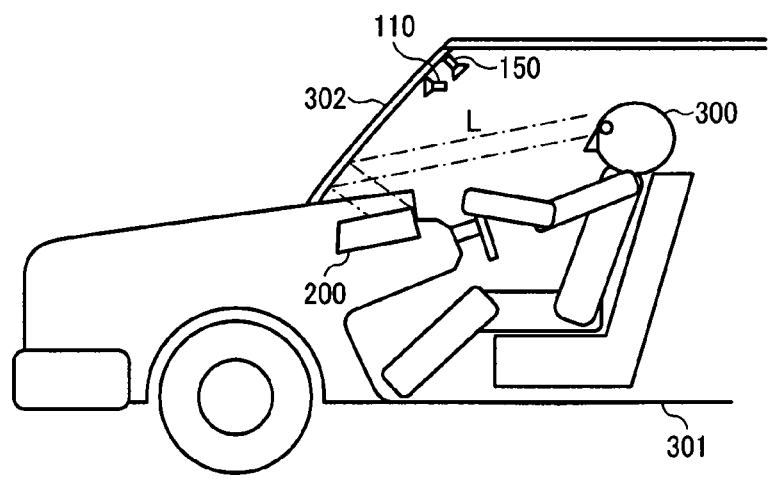
FIG. 2 is a schematic diagram of the configuration of a car for which an on-vehicle HUD according to an embodiment of the present invention is provided.
Figure 3:
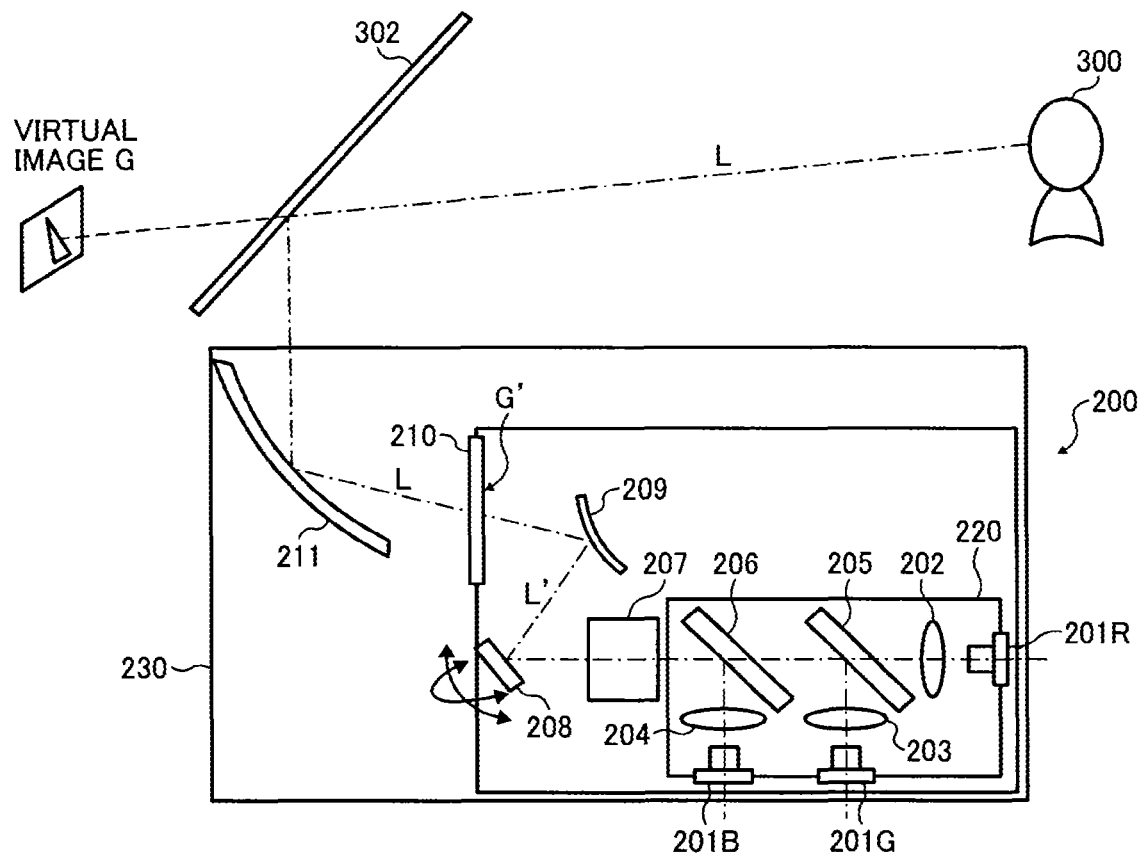
FIG. 3 is a schematic diagram of the internal structure of an on-vehicle HUD according to an example embodiment of the present invention.

FIG. 1 is a schematic diagram of an example virtual image G displayed in a display area 700 over the sight ahead of the vehicle 301 viewed by a driver 300 through a front windshield 302, according to the present embodiment. FIG. 2 is a schematic diagram of a car for which the on-vehicle HUD according to the present example embodiment is provided. FIG. 3 is a schematic diagram of the internal structure of the on-vehicle HUD according to the present example embodiment.

An on-vehicle HUD 200 according to the present embodiment is installed, for example, in the dashboard of the car 301 that serves as a mobile object. The projection light L, which is the light for projecting an image, that is emitted from the on-vehicle HUD 200 disposed in the dashboard is reflected at a front windshield 302 that serves as a light transmission member, and is headed for a driver 300. Accordingly, the driver 300 can visually recognize a HUD display image such as a navigation image, which will be described later, as a virtual image. Note that a combiner that serves as a light transmission member may be disposed on the inner wall of the front windshield 302, and the driver 300 may visually recognizes a virtual image formed by the projection light L that is reflected by the combiner.

In the present embodiment, the optical system or the like of the on-vehicle HUD 200 is configured such that the distance from the driver 300 to a virtual image G becomes equal to or longer than 5 meters (m). In the known on-vehicle HUDs, the distance from the driver 300 to the virtual image G is about 2 m. Usually, the driver 300 observes a point at infinity ahead of the vehicle, or observes a preceding vehicle a few tens of meters ahead of the vehicle. When the driver 300 who is focusing on an object in the distance attempts to visually recognize the virtual image G that is two meters ahead of the vehicle, the crystalline lenses of the eyes need to be moved widely because the focal length greatly varies. In such cases, the time required to adjust the focus of the eyes and focus on the virtual image G becomes longer, and it takes a long time to recognize the detail of the virtual image G. What is worse, the eyes of the driver 300 tend to get tired. Moreover, it is difficult for the driver to realize the detail of the virtual image G, and it is difficult to use the virtual image G to appropriately provide information to the driver.

If the distance to the virtual image G is equal to or longer than 5 m as in the present embodiment, the amount of movement in the crystalline lenses of the eyes is reduced to a less amount of movement than the background art, and the time required to adjust the focus of the eyes and focus on the virtual image G becomes shorter. Accordingly, the driver 300 can recognize the detail of the virtual image G at an early stage, and the possible tiredness of the eyes of the driver 300 can be reduced. Moreover, it becomes easier for the driver to realize the detail of the virtual image G, and it is easy to use the virtual image G to appropriately provide information to the driver.

When the distance to the virtual image G is about 2 m and the driver attempts to adjust the focal point of the eyes on the virtual image G, the convergence motion of the eyes are usually required. The convergence motion is a major factor in achieving the desired sense of distance or depth perception to an object to be visually recognized. In the present embodiment, as will be described later, the display is controlled such that the perception distance of the virtual image G will be perceived by motion parallax. If the convergence motion occurs to the eyes to focus on the virtual image G when the display is controlled as above, the sense of distance (change in perception distance) or the depth perception (difference in perception distance), which are expected to be brought by a motion parallax, cannot be perceived as desired. Accordingly, if the convergence motion occurs to the eyes, the driver cannot perceive the information as intended by the configuration according to the present embodiment. Note that such configuration will be described later, and the effect is estimated in view of the difference or change in the perception distance of an image.

When the distance to the virtual image G is equal to or greater than 5 m, the driver can focus on the virtual image G with almost no convergence motion in the eyes. Accordingly, the sense of distance (change in perception distance) or the depth perception (difference in perception distance), which are expected to be brought by a motion parallax, can be perceived as desired in absence of the convergence motion of the eyes. As described above, according to the present embodiment, the driver perceive the information as intended in view of the sense of distance or depth perception of an image.

The on-vehicle HUD 200 includes, in the HUD 230, red, green, and blue laser beam sources 201R, 201G, and 201B, collimator lenses 202, 203, and 204 that are provided for the laser beam sources 201R, 201G, and 201B, respectively, two dichroic mirrors 205 and 206, a light quantity adjuster 207, an optical scanner 208 that scans light, a free-form surface mirror 209, a microlens array 210 as a light dispersing member, and a projector mirror 211 that serves as a light reflecting member. A light source unit 220 according to the present embodiment includes the laser beam sources 201R, 201G, and 201B, the collimator lenses 202, 203, and 204, and the dichroic mirrors 205 and 206, and these elements are unitized by an optical housing.

Each of the laser beam sources 201R, 201G, and 201B may be an LD (semiconductor laser element). The wavelength of the laser-beam bundle that is emitted from the red laser beam source 201R is, for example, 640 nanometer (nm). The wavelength of the laser-beam bundle that is emitted from the green laser beam source 201G is, for example, 530 nm. The wavelength of the laser-beam bundle that is emitted from the blue laser beam source 201B is, for example, 445 nm.

The on-vehicle HUD 200 according to the present embodiment projects the intermediate image formed on the microlens array 210 onto the front windshield 302 of the vehicle 301, such that the driver 300 can visually recognize the magnified intermediate image as a virtual image G. The laser beams of the RGB colors emitted from the laser beam sources 201R, 201G, and 201B are approximately collimated by the collimator lenses 202, 203, and 204, and are combined by the two dichroic mirrors 205 and 206. The light quantity of the combined laser beam is adjusted by the light quantity adjuster 207, and then the adjusted laser beam is two-dimensionally scanned by the mirror of the optical scanner 208. The scanned light U that is two-dimensionally scanned by the optical scanner 208 is reflected by the free-form surface mirror 209 so as to correct the distortion, and then is collected and condensed to the microlens array 210. Accordingly, an intermediate image is drawn.

In the present embodiment, the microlens array 210 is used as a light dispersing member that individually disperses and emits the laser-beam bundle of each pixel of the intermediate image (i.e., each point of the intermediate image). However, any other light dispersing member may be used. Alternatively, a liquid crystal display (LCD) or a vacuum fluorescent display (VFD) may be used as a method of forming the intermediate image G'.

However, in order to display the virtual image G with a wide dimension and high brightness, the laser scanning system is desired as in the present embodiment. In the systems where an LCD or VFD is used, a non-image area of the display area on which the virtual image G is displayed is slightly irradiated with light, and it is difficult to completely shut such light to the non-image area. For this reason, in the systems where an LCD or VFD is used, the non-image area disturbs the visual recognizability of the sight ahead of the vehicle 301. By contrast, if a laser scanning system is adopted as in the present embodiment, the light that irradiates the non-image area of the display area on which the virtual image G is displayed can be completely shut by switching off the laser beam sources 201R, 201G, and 201B. For this reason, if a laser scanning system is adopted as in the present embodiment, the non-image area does not disturb the visual recognizability of the sight ahead of the vehicle 301 as the light from the on-vehicle HUD 200 that may irradiate the non-image area can be completely shut.

When the degree of warning is to be enhanced by gradually increasing the brightness of the warning image that alerts the driver, the display needs to be controlled such that only the brightness of the warning image gradually increases among the various kinds of images displayed in the display area 700. Again, the laser scanning system is suitable for such cases where the display is controlled such that the brightness of a part of the images displayed in the display area 700 is selectively increased. In the systems with the LCD or the VFD, the brightness of the images other than the warning image also increases among the various kinds of images displayed in the display area 700. In such cases, the difference in brightness cannot be increased between the warning image and the other images. Accordingly, the degree of the warning cannot be sufficiently enhanced by gradually increasing the brightness of the warning image.

The optical scanner 208 uses a known actuator driver system such as a micro-electromechanical systems (MEMS) to incline the mirror to the main-scanning direction and the sub-scanning direction, and two-dimensionally scans (raster-scans) the laser beams that enter the mirror. The mirror is controlled in synchronization with the timing at which the laser beam sources 201R, 201G, and 201B emit light. The configuration of the optical scanner 208 is not limited to the present embodiment described above, but the optical scanner 208 may be configured, for example, by a mirror system that includes two mirrors that pivot or rotate around the two axes that are orthogonal to each other.

Figure 4:
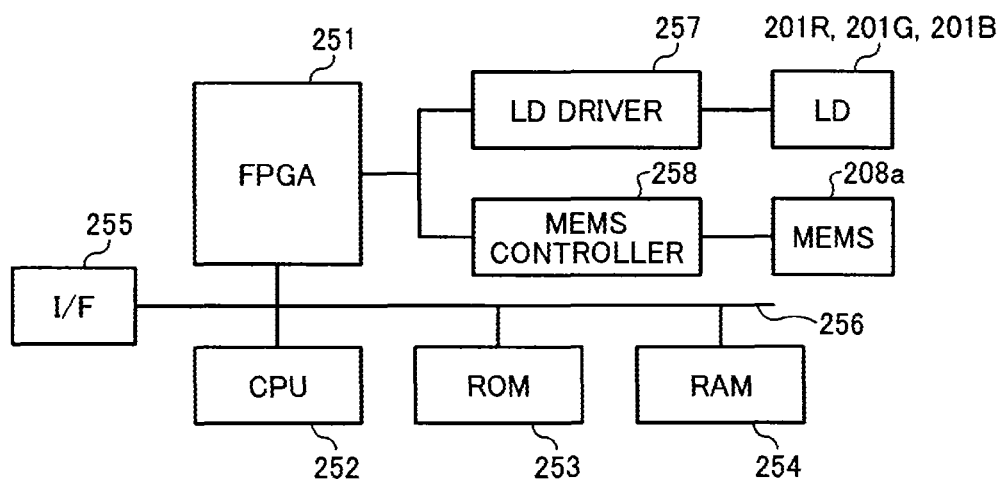
FIG. 4 is a block diagram illustrating the hardware configuration of a control system of an on-vehicle HUD according to an example of the present invention.

FIG. 4 is a block diagram illustrating the hardware configuration of a control system of the on-vehicle HUD 200 according to the present embodiment. The control system of the on-vehicle HUD 200 includes a field programmable gate array (FPGA) 251, a central processing unit (CPU) 252, a read only memory (ROM) 253, a random access memory (RAM) 254, an interface (I/F) 255, a bus line 256, a laser diode (LD) driver 257, and a MEMS controller 258. The FPGA 251 uses the LD driver 257 to control the operation of the laser beam sources 201R, 201G, and 201B of the light source unit 220. Moreover, the FPGA 251 uses the MEMS controller 258 to controlling the operation of a MEMS 208a of the optical scanner 208. The CPU 252 controls the operation of the on-vehicle HUD 200. The ROM 253 stores various kinds of programs such as an image processing program that is executed by the CPU 252 to control the operation of the on-vehicle HUD 200. The RAM 254 is mainly used as a working area in which the CPU 252 executes a program. The I/F 255 allows the on-vehicle HUD 200 to communicate with an external controller such as a controller area network (CAN) of the vehicle 301. For example, the on-vehicle HUD 200 is connected to an object recognition device 100, a vehicle navigation device 400, and various kinds of sensor device 500 through the CAN of the vehicle 301. The object recognition device 100, the vehicle navigation device 400, and the sensor device 500 will be described later in detail.

Figure 5:
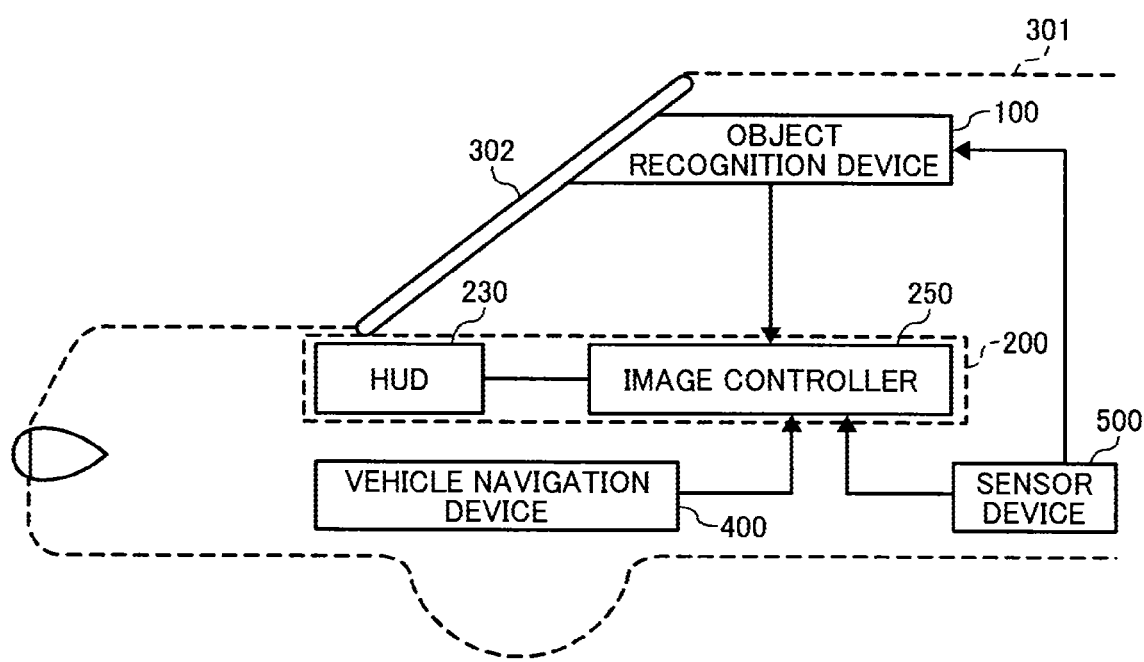
FIG. 5 is a block diagram illustrating an outline of the configuration of an information provision system for a driver, according to an embodiment of the present invention.

FIG. 5 is a block diagram illustrating an outline of the configuration of an information provision system for a driver according to the present embodiment. In the present embodiment, as an information acquisition unit that obtains for-driver information to be provided for a driver via a virtual image G, for example, the object recognition device 100, the vehicle navigation device 400, and the sensor device 500 are provided. The on-vehicle HUD 200 according to the present embodiment includes the HUD 230 that serves as an image-light projection device, and the image controller 250 that serves as a display controller. The information acquisition unit according to the present embodiment is provided for the vehicle 301, but the vehicle 301 may use an external information acquisition unit to obtain the information input from the external information acquisition unit through a means of communication.

Figure 6:
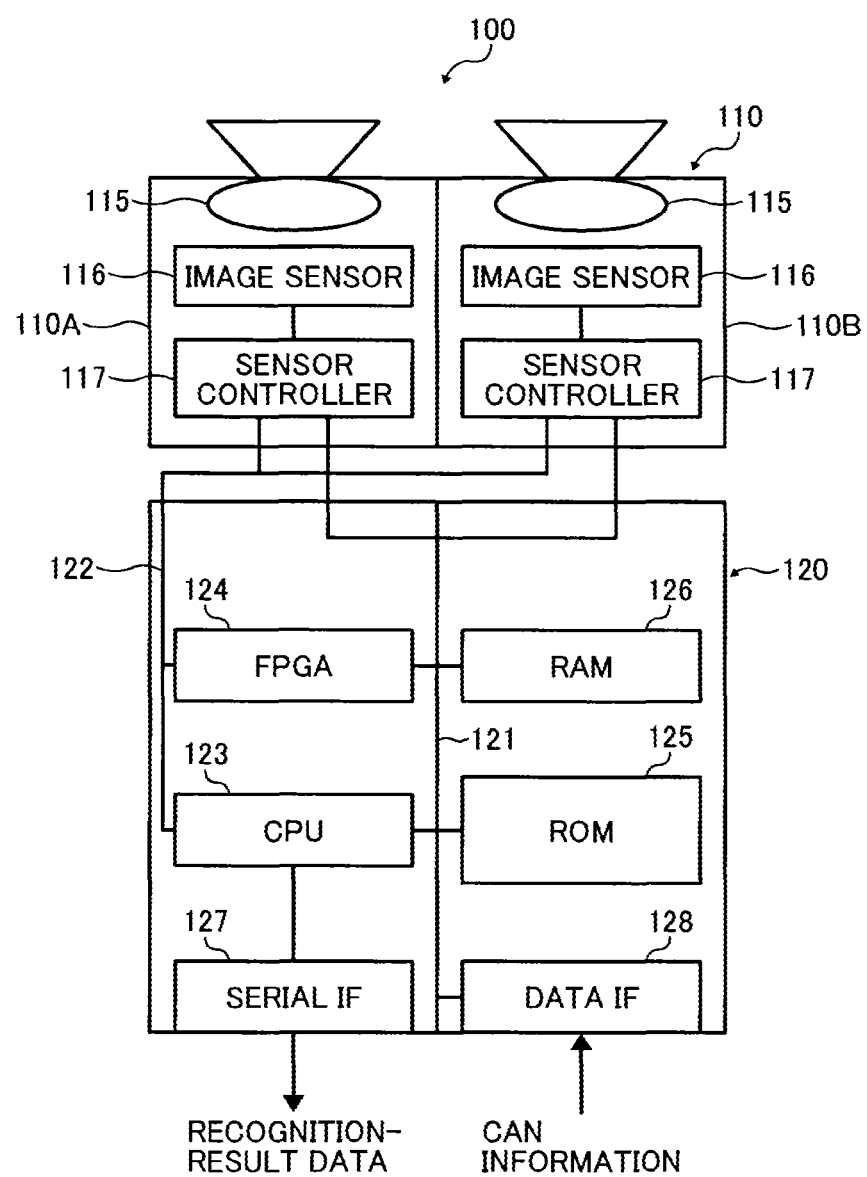
FIG. 6 is a schematic block diagram illustrating the hardware configuration of an object recognition device in an information provision system for a driver, according to an embodiment of the present invention.

FIG. 6 is a schematic block diagram illustrating the hardware configuration of the object recognition device 100 according to the present embodiment. The object recognition device 100 according to the present embodiment includes a stereo camera 110 that captures an area ahead of the vehicle 301 as a captured area, and an information processing unit 120 that performs image processing to recognize a prescribed object existing in the captured area according to the image data captured by the stereo camera 110. Note that the stereo camera 110 may be replaced with a combination of a monocular camera that serves as an imaging unit, and a laser radar (millimeter-wave radar) that serves as a distance measuring equipment.

The stereo camera 110 includes a first camera unit 110A for a left eye and a second camera unit 110B for a right eye, and these two camera units are combined together in parallel. Each of the camera unit 110A and the camera unit 110B includes a lens 115, an image sensor 116, and a sensor controller 117. The image sensor 116 may be composed of, for example, a charge-coupled device (CCD) or a complementary metal oxide semiconductor (CMOS). The sensor controller 117 controls, for example, the exposure of the image sensor 116, the reading of an image, the communication with an external circuit, and the sending of the image data. The stereo camera 110 is disposed near the rear-view mirror provided for the front windshield 302 of the vehicle 301.

The information processing unit 120 includes a data bus line 121, a serial bus line 122, central processing unit (CPU) 123, a field programmable gate array (FPGA) 124, a read only memory (ROM) 125, a random access memory (RAM) 126, a serial interface (I/F) 127, and a data interface (I/F) 128.

The stereo camera 110 is connected to the information processing unit 120 through the data bus line 121 and the serial bus line 122. The CPU 123 controls, for example, the sensor controllers 117 of the stereo camera 110, the entire operation of the information processing unit 120, and the execution of image processing. The brightness image data of the images that are captured by the image sensors 116 of the camera unit 110A and the camera unit 110B are written into the RAM 126 of the information processing unit 120 through the data bus line 121. The control data for changing the exposure value of a sensor from the CPU 123 or the FPGA 124, the control data for changing the image reading parameter, various kinds of setting data, or the like are transmitted and received through the serial bus line 122.

The FPGA 124 performs processing that needs to be done in real time on the image data stored in the RAM 126, such as gamma correction, distortion correction (collimation of an image on the right and left), parallax computation using block matching, to generate a parallax image, and writes the generated parallax image into the RAM 18 again. In the ROM 125, a recognition program is stored for recognizing a prescribed object including a three-dimensional object such as a vehicle or pedestrian, a boundary line for lanes such as a white line on the road, and a curbstone or median strip arranged by the roadside. The recognition program is an example of an image processing program.

The CPU 123 obtains CAN information such as vehicle speed, acceleration, a rudder angle, and a yaw rate from the sensor device 500 through the data I/F 128. The data I/F 128 may be, for example, a CAN of the vehicle 301. Then, the CPU 123 performs image processing using the brightness image and parallax image stored in the RAM 126, according to the recognition program stored in the ROM 125, and recognizes an object such as a preceding vehicle 350 or a traffic lane line.

The recognition-result data of an object is supplied, for example, to the image controller 250 and an external device such as a vehicle drive control unit, through the serial 1/F 127. The vehicle drive control unit uses the recognition-result data of an object to perform brake control, speed control, steering control, or the like of the vehicle 301, and implements, for example, cruise control in which the vehicle 301 automatically tracks a preceding vehicle so as to maintain a prescribed following distance, and an automatic brake control in which the collision with an obstacle ahead of the vehicle is avoided or attenuated.

The vehicle navigation device 400 according to the present embodiment may be any known vehicle navigation device provided for a vehicle or the like. The vehicle navigation device 400 outputs information used for generating a route navigation image to be displayed on a virtual image G, and the information output from the vehicle navigation device 400 is input to the image controller 250. The information output from the vehicle navigation device 400 includes, for example, as illustrated in FIG. 1, the number of the lanes (traffic lanes) of the road on which the vehicle 301 is traveling, the distance left before the next point of direction change (e.g., right turn, left turn, and turning point), and an image that indicates information such as the direction of the next direction change. As such information is input from the vehicle navigation device 400 to the image controller 250, under the control of the image controller 250, the on-vehicle HUD 200 displays navigation images such as a lane indicator image 711, a path indicator image 721, a remaining distance indicator image 722, an intersection or the like name indicator image 723, on an upper display area A or middle display area B of the display area 700.

In the example image illustrated in FIG. 1, images indicating road-specific information (e.g., road name, and speed limit) is displayed on a lower display area C of the display area 700. The road-specific information is also input from the vehicle navigation device 400 to the image controller 250. The image controller 250 uses the on-vehicle HUD 200 to display the road-specific information such as a road-name display image 701, a speed limit display image 702, and a no-passing zone display image 703 on the lower display area C of the display area 700.

The sensor device 500 according to the present embodiment includes one or two or more sensors that detect various kinds of information such as the behavior of the vehicle 301, the state of the vehicle 301, and the environment around the vehicle 301. The sensor device 500 outputs sensing information used for generating an image to be displayed as a virtual image G, and the information output from the sensor 500 is input to the image controller 250. In the example image illustrated in FIG. 1, a vehicle speed display image 704 indicating the vehicle speed of the vehicle 301 (i.e., the textual image of "83 km/h" in FIG. 1) is displayed on the lower display area C of the display area 700. The vehicle-speed information included in the CAN information of the vehicle 301 is input from the sensor device 500 to the image controller 250, and the image controller 250 controls the on-vehicle HUD 200 to display the textual image indicating the vehicle speed on the lower display area C of the display area 700.

In addition to the sensor that detects the vehicle speed of the vehicle 301, the sensor device 500 includes, for example, a laser radar or imaging device that detects the distance from another vehicle, a pedestrian, or construction such as a guard rail and a utility pole, which exist around (ahead of, on the side of, in the rear of) the vehicle 301, a sensor that detects the external environmental information (e.g., outside air temperature, brightness, and weather) of the vehicle 301, a sensor that detects the driving action (e.g., braking action, and the degree of acceleration) of the driver 300, a sensor that senses the amount of the fuel remaining in the fuel tank of the vehicle 301, and a sensor that senses the state of various kinds of vehicle-borne equipment such as an engine and a battery. As such information is detected by the sensor 500 device and sent to the image controller 250, the on-vehicle HUD 200 can display the information as a virtual image G. Accordingly, the information can be provided to the driver 300.

Figure 7:
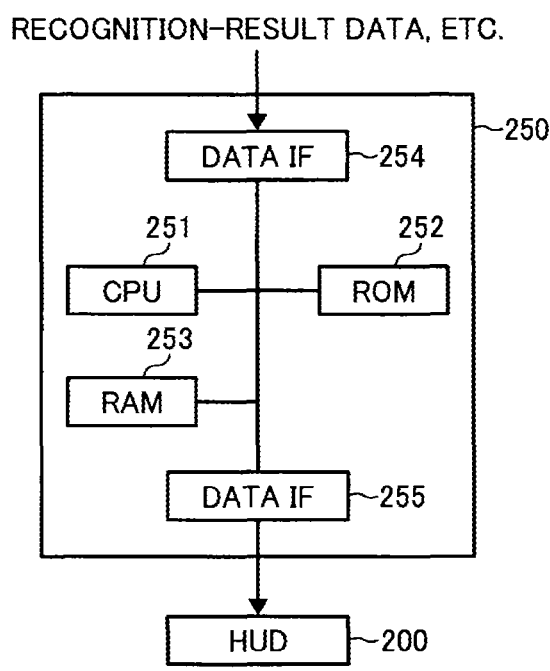
FIG. 7 is a schematic block diagram illustrating the hardware configuration of an image controller in an on-vehicle HUD according to an embodiment of the present invention.

FIG. 7 is a schematic block diagram illustrating the hardware configuration of the image controller 250. In the image controller 250, a CPU 251, a RAM 252, a ROM 253, an input data interface (I/F) 254, and an output data interface (I/F) 255 are connected to each other via a data bus line. To the input data I/F 254, for example, various kinds of recognition-result data output from the object recognition device 100, the sensing information output from the sensor device 500, and various kinds of information output from the vehicle navigation device 400 are input. From the output data I/F 255, for example, a control signal for the on-vehicle HUD 200 is output. The CPU 251 executes various kinds of computer program such as an information-provision control program, which is stored, for example, in the ROM 253, to control the image controller 250 to perform various kinds of control and process as will be described later.

Next, a virtual image G that is displayed by the on-vehicle HUD 200 according to the present embodiment is described. In the present embodiment, for-driver information that the on-vehicle HUD 200 provides for a driver via a virtual image G may be any information. In the present embodiment, the for-driver information is broadly divided into passive information and active information.

The passive information is the information that is passively recognized by a driver at the timing when a prescribed information provision condition is met. Accordingly, the passive information includes the information that is provided to the driver at the timing when the on-vehicle HUD 200 is configured, and the passive information includes the information whose provision timing has a certain relation with the detail of the information. The passive information includes, for example, security information for driving, and route navigation information.

The security information for driving includes, for example, the following-distance information indicating the distance between the vehicle 301 and the preceding vehicle 350 (i.e., a following-distance presenting image 712 as will be described later), and information including urgent matters for driving (e.g., warning information such as an instruction for urgent action to be taken by a driver, or attention attracting information).

The route navigation information indicates a route to a prescribed destination, and such a route is provided to a driver by any known vehicle navigation device. The route navigation information includes, for example, lane information (i.e., the lane indicator image 711) indicating a lane to be taken at an upcoming intersection, and direction-change instruction information indicating a direction change to be made at the next intersection or branch point where the direction is to be changed from the straight-ahead direction.

The direction-change instruction information includes, for example, path indicating information (i.e., the path indicator image 721) that indicates the path to be taken at the next intersection or branch point, remaining distance information (i.e., the remaining distance indicator image 722) indicating the distance to the intersection or branch point where the direction change is to be made, and name information of the intersection or branch point (i.e., the intersection or the like name indicator image 723).

The active information is the information that is actively recognized by a driver at the timing specified by the driver himself or herself. The active information is to be provided to the driver only when he or she wishes. For example, the active information includes information where the timing of its provision has low or no relevance to the detail of the information. As the active information is obtained by the driver at the timing when he or she wishes, the active information is usually displayed for a long time or displayed continuously. For example, the road-specific information of the road on which the vehicle 301 is traveling, the vehicle-speed information (i.e., the vehicle speed display image 704) of the vehicle 301, the current-time information are included in the active information.

The road-specific information includes, for example, the road-name information (i.e., the road-name display image 701), the regulation information of the road such as speed limit (i.e., the speed limit display image 702 and the no-passing zone display image 703), and other kinds of information of the road useful for the driver.

In the present embodiment, the for-driver information, which is broadly divided into the active information and the passive information as described above, is displayed in a corresponding area of the display area 700 where a virtual image is displayable. More specifically, in the present embodiment, the display area 700 is divided into three display areas in the up-and-down directions. Then, a passive-information image that corresponds to the passive information is displayed in the upper display area A and the middle display area B of the obtained three display areas, and an active-information image that corresponds to the active information is displayed in the lower display area C. Note that some of the active-information image may be displayed upper display area A and the middle display area B. In such cases, the active-information image is displayed in such a manner that a higher priority is given to the viewability of the passive-information image displayed in the upper display area A and the middle display area B.

The passive information according to the present embodiment includes instruction information indicating an instruction given to the driver 300, like the route navigation information or the like. When such instruction information is provided to a driver, it is usually desired that not only an instruction image indicating an upcoming instruction but also an instruction image indicating a future instruction be displayed together. By so doing, the feelings of anxiety that a driver may have (e.g., the driver may be anxious about what action he/she has to make in the near future) can be reduced. In the example illustrated in FIG. 1, together with the lane indicator image 711 indicating a lane to be taken at an upcoming intersection, direction-change instruction images including the path indicator image 721, the remaining distance indicator image 722, and the intersection or the like name indicator image 723 are displayed, indicating a direction change to be made at the next intersection or branch point where the direction is to be changed from the straight-ahead direction. In the following description, the path indicator image 721, the remaining distance indicator image 722, and the intersection or the like name indicator image 723 may be referred to simply as direction-change instruction images 721, 722, and 723, for the sake of explanatory convenience.

As described above, when a plurality of instruction images with varying operational sequences, i.e., the lane indicator image 711 and the direction-change instruction images 721, 722, and 723, are displayed in the display area 700 at the same time, it is desired that the situation be avoided in which the driver confuses among the operational sequences of the instruction indicated by the instruction images.

In view of the above circumstances, in the present embodiment, the display of a plurality of instruction images with varying operational sequences is controlled such that an instruction image with a lower priority for the driver in the operational sequence is displayed on an upper side of the display area 700. In other words, the direction-change instruction images 721, 722, and 723 with a lower priority in the operational sequence than the lane indicator image 711 is displayed on an upper side of the display area 700 than the lane indicator image 711. Accordingly, the situation can be avoided in which the driver confuses among the operational sequences of the instruction indicated by lane indicator image 711 and the direction-change instruction images 721, 722, and 723. Such avoidance is achieved for the reasons given below.

While the driver 300 is driving the vehicle 301, normally, he or she has a sense of distance that an object existing ahead of the moving vehicle 301 gets close to the current position as the time passes by. Moreover, the driver 300 has a sense of time that a future event gets close to the current time as the time passes by. An object existing ahead of the moving vehicle 301 reaches the vehicle 301 in a shorter time as the distance between the object and the vehicle 301 is shorter, and it takes a longer time for the object existing ahead of the moving vehicle 301 to reach the position of the vehicle 301 as the distance between the object and the vehicle 301 is longer. For these reasons, an object that is ahead of the vehicle 301 and is far away from the moving vehicle 301 has a high affinity of perception for a far future event, and an object that is ahead of the vehicle 301 and is close to the moving vehicle 301 has a high affinity of perception for a close future event.

In view of such an affinity, an indicator image of far future (i e, an instruction image with a lower priority in the operational sequence such as the direction-change instruction images 721, 722, and 723) is displayed so as to overlap with a position where an object that is far away from the moving vehicle 301 ahead of the vehicle 301 is visually recognized, and an indicator image of near future or now (i.e., an instruction image with a high priority in the operational sequence such as the lane indicator image 711) is displayed so as to overlap with a position where an object that is close to the moving vehicle 301 ahead of the vehicle 301 is visually recognized. By so doing, the sequence of operation of the instruction can be recognized by the driver through intuition.

As described above, while the driver 300 is driving the vehicle, he or she usually observes a point at infinity ahead of the vehicle 301, or observes the rear of preceding vehicle 350 a few tens of meters ahead of the vehicle 301. In such cases, the observation point is approximately near the center in the vertical direction of the sight viewed through the front windshield 302. In the present embodiment, the display area 700 in which the lane indicator image 711 and the direction-change instruction images 721, 722, and 723 with different operational sequences are displayed is positioned on a lower side of the sight viewed through the front windshield 302. Accordingly, in the present embodiment, the lane indicator image 711 and the direction-change instruction images 721, 722, and 723 are displayed under the observation point of the driver so as to overlap with the sight viewed through the front windshield 302. In the sight under the observation point of the driver 300 ahead of the vehicle 301, an object that is far away from the vehicle 301 is visually recognized on an upper side of the sight, and an object that is close to the vehicle 301 is visually recognized on a lower side of the sight.

Accordingly, in the present embodiment, the direction-change instruction images 721, 722, and 723 with a lower priority in the operational sequence than the lane indicator image 711 is displayed on an upper side of the display area 700 than the lane indicator image 711. More specifically, the direction-change instruction images 721, 722, and 723 with a lower priority in the operational sequence are displayed in the upper display area A of the display area 700 that overlaps with a point where an object that is far away from the moving vehicle 301 ahead of the vehicle 301 is visually recognized, and the lane indicator image 711 with a higher priority in the operational sequence is displayed in the middle display area B of the display area 700 that overlaps with a point where an object that is close to the moving vehicle 301 ahead of the vehicle 301 is visually recognized. By so doing, due to the high affinity of recognition as described above, the sequence of operation of the instruction can be recognized by the driver through intuition, and the situation can be avoided in which the driver confuses among the operational sequences of the instruction indicated by the instruction images.

On the contrary, if the affinity of recognition is not considered and the position at which the lane indicator image 711 is displayed and the position at which the direction-change instruction images 721, 722, and 723 are displayed are, for example, inverted up-and-down direction with reference to the present embodiment or rearranged horizontally, it becomes difficult for the driver to recognize the operational sequence through intuition as the driver is disturbed by the sense of distance or the sense of time as described above.

In view of the affinity of recognition as described above, in the present embodiment, instruction images that indicate the instructions with the same operational sequence are horizontally arranged. More specifically, the three direction-change instruction images 721, 722, and 723 that are displayed in the upper display area A are horizontally arranged in the upper display area A to indicate the direction-change instruction information indicating a direction change to be made at the next intersection or branch point where the direction is to be changed from the straight-ahead direction. According to the sense of distance or the sense of time as described above, the three direction-change instruction images 721, 722, and 723 that are horizontally arranged at the same position in the up-and-down directions can easily be recognized through intuition that these images indicate the instruction to be dealt with around the same time.

Accordingly, the driver 300 can appropriately recognize the information of the direction-change instruction images 721, 722, and 723.

In the present embodiment, a stereoscopic image is used as the virtual image G that is displayed in the display area 700. More specifically, perspective images are used as the lane indicator image 711 and the following-distance presenting image 712 that are displayed in the middle display area B of the display area 700.

More specifically, a perspective image that is drawn by the perspective drawing method such that the length of the five horizontal lines of the following-distance presenting image 712 becomes shorter towards the upper side and the following-distance presenting image 712 heads for a single vanishing point. In particular, in the present embodiment, the following-distance presenting image 712 is displayed such that the vanishing point approximately matches the observation point of the driver. Due to this configuration, while the driver 300 is driving, he or she can easily perceive the depth of the following-distance presenting image 712. Moreover, in the present embodiment, a perspective image in which the thickness of the horizontal lines becomes thinner towards the upper side and the brightness of the horizontal lines becomes lower towards the upper side is used. Due to this configuration, while the driver 300 is driving, he or she can even more easily perceive the depth of the following-distance presenting image 712.

The depth perception is created for the virtual image G that is displayed in the display area 700 by making use of such a stereoscopic image as described above. Accordingly, the driver can easily perceive the relevance between the distance to the object in the sight ahead of the vehicle and the position of the image displayed in display area 700 in the up-and-down directions. As a result, the above-described affinity of recognition is more easily achieved, and the driver can easily recognize through intuition that the instruction of the lane indicator image 711 displayed in the middle display area B of the display area 700 is to be dealt with prior to the instruction of the direction-change instruction images 721, 722, and 723 displayed in the upper display area A of the display area 700.

Note that lane indicator image 711 is also drawn by the perspective drawing method in a similar manner to the following-distance presenting image 712, such that the lane indicator image 711 heads for the same vanishing point as that of the following-distance presenting image 712. However, the lane indicator image 711 is to provide the instruction to the driver. For this reason, if a lower priority is given to the creation of the depth perception to the lane indicator image 711 and a higher priority is given to the accurate provision of the instruction indicated by the lane indicator image 711 to the driver, for example, the brightness of the images of the three arrows that make up the lane indicator image 711 may be increased towards the leading ends of the arrows. The laser scanning system provides easier brightness control for each image area compared with the other systems, and thus a greater contrast between a low-brightness area and a high-brightness area is achieved. For this reason, the laser scanning system effectively enables increasing the brightness of the leading ends of the arrows as described above to provide information to the driver in an accurate manner. While it is easier to create the depth perception when the brightness becomes lower towards the upper side, the brightness of the lane indicator image 711 becomes higher towards the upper side in the above cases. Although it is not possible to create the depth perception in the above cases, the visual recognizability of the arrows increases by increasing the brightness of the leading ends of the arrows. Accordingly, the instruction that is indicated by the lane indicator image 711 can more accurately provided to the driver. It is to be noted that the depth perception does not significantly deteriorate in the above cases as the lane indicator image 711 is drawn using the perspective drawing method.

Next, a method of creating a sense of distance or depth perception by making the driver perceive the distance to the virtual image G making use of a motion parallax is described. In the present embodiment, a motion-parallax image is used as the virtual image G. The motion parallax indicates the parallax that is caused as the position of the eyes of the driver 300 (i.e., the position of the viewpoint) moves. The driver 300 perceives the distance and depth dimension with reference to an object, which are influenced by a motion parallax due to the displacement in movement where an object closer to the driver in the sight ahead of the vehicle appears to move in a greater amount and an object more distant from the driver in the sight ahead of the vehicle appears to move in a smaller amount when the position of the eyes of the driver 300 moves.

In the present embodiment, as illustrated in FIG. 2, a driver camera 150 that monitors the positions of the eyes of the driver 300 (i.e., the location of the viewpoint) is disposed near the rear-view mirror provided for the front windshield 302 of the vehicle 301. The driver camera 150 serves as a viewpoint detector. In order to monitor the motion of the driver 300 in the up-and-down and right-and-left directions accurately, it is desired that the driver camera 150 be disposed around the median line drawn from the driver 300 who sits in the driver's seat. Moreover, it is desired that the driver camera 150 be disposed, for example, on an upper side so as not to obstruct the view of the driver 300.

The driver camera 150 is a monocular camera that is configured to capture an area where the driver 300 who sits in the driver's seat and is driving the vehicle is expected to move his/her head. In a similar manner to the camera unit 110A and the camera unit 110B provided for the stereo camera 110, the driver camera 150 includes, for example, a lens, an image sensor, and a sensor controller. A stereo camera may be used as the driver camera 150 in order to keep track of the position of the eyes of the driver in the forward and backward directions.

The brightness image data of the images captured by the driver camera 150 is input to image controller 250. The image controller 250 uses the CPU 251 to execute an information-provision control program stored in the ROM 253 or the like, and recognizes the position of the eyes of the driver 300 based on the brightness image data obtained from the driver camera 150. In the present embodiment, the position of the head of the driver 300 is recognized in a simplified manner based on the brightness image data obtained from the driver camera 150, and the position of the eyes of the driver 300 is estimated based on the results of the recognition. Note that any desired known recognition method may be adopted as a method of recognizing the position of the head of the driver 300.

Figure 8:
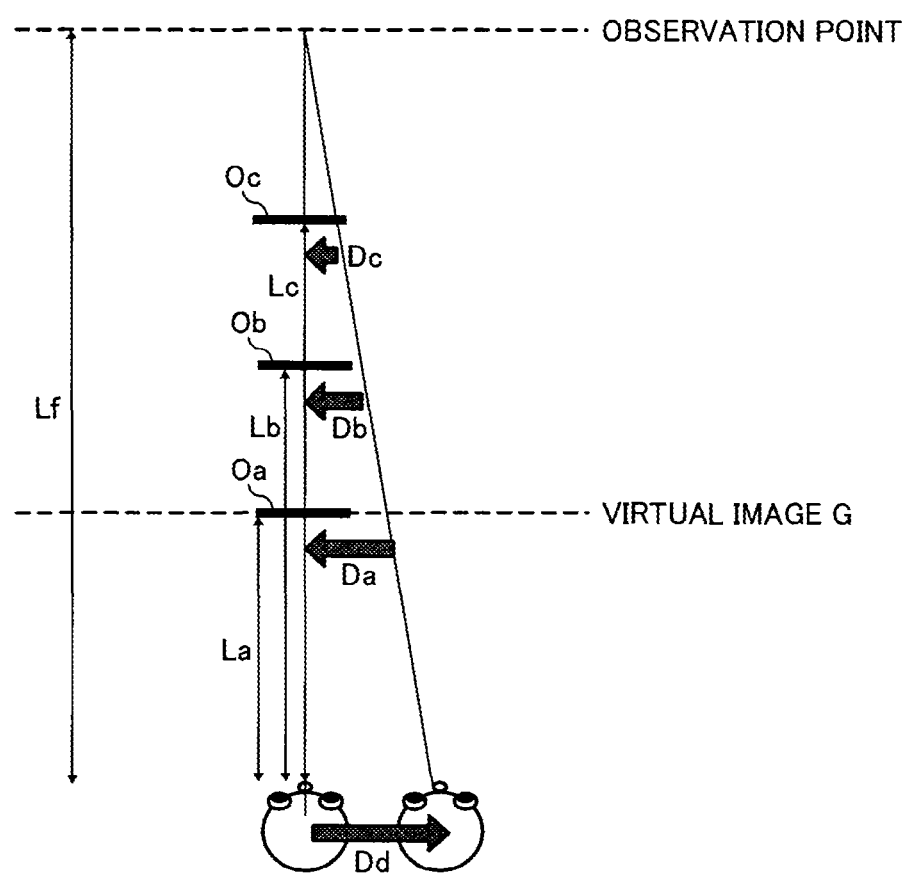
FIG. 8 is a schematic diagram illustrating a method of processing a virtual image with a depth perception that is created by a motion parallax, according to an embodiment of the present invention.

FIG. 8 is a schematic diagram illustrating a method of processing a virtual image G with a depth perception that is created by a motion parallax, according to the present embodiment. When the head of the driver 300 moves by the amount "Dd" as illustrated in FIG. 8, the position at which an object Oa with a short distance La from the driver 300 is visually recognized moves by the amount "Da", and the position at which an object Ob with a long distance Lb from the driver 300 is visually recognized moves by the amount "Db" that is smaller than "Da". Moreover, the position at which an object Oc with an even longer distance Lc from the driver 300 is visually recognized moves by the amount "Dc" that is even smaller than "Db". Due to the difference in the amounts of movement "Da", "Db", and "Dc" of the positions at which the objects Oa, Ob, and Oc are visually recognized, the driver 300 can perceive that the object Oa, the object Ob, and the object Oc exist with the distance La, distance Lb, and distance Lc, respectively, away from the driver 300.

In the present embodiment, the virtual image G is displayed with the distance of 5 m away from the driver 300, and any of the images on the virtual image G is displayed with the distance of 5 m away from the driver 300. In the present embodiment, a plurality of images on the virtual image G are modified using the motion parallax as described above such that the images are perceived by the driver 300 as if the images are displayed with varying distances.

More specifically, the image controller 250 recognizes the position of the head of the driver 300 at prescribed time intervals based on the brightness image data of the images captured by the driver camera 150. Then, the image controller 250 calculates the driver's head movement amount Dd that indicates the amount where the head of driver 300 has moved during the prescribed time intervals. In this case, the position at which the virtual image G is visually recognized with the distance of 5 m moves by the amount "Da".

In the present embodiment, the positions of the images that are displayed in the lower display area C are fixed in the display area 700. Accordingly, the position at which the images displayed in the lower display area C are visually recognized moves by the amount "Da", which is the same as the amount in which the virtual image G moves. As a result, the driver 300 perceives the images displayed in the lower display area C with the distance La (5 m).

By contrast, the image controller 250 shifts the images displayed in the middle display area B of the display area 700 of the virtual image G to the reverse direction to the direction in which the head of the driver has moved in the display area 700 by the amount "Da–Db", based on the calculated driver's head movement amount Dd. Accordingly, the position at which the images displayed in the middle display area B are visually recognized by the driver 300 moves by the amount "Db". As a result, the driver 300 perceives the images displayed in the middle display area B with the distance Lb.

In a similar manner to the above, the image controller 250 shifts the images displayed in the upper display area A of the display area 700 of the virtual image G to the reverse direction to the direction in which the head of the driver has moved in the display area 700 by the amount "Da–Dc", based on the calculated driver's head movement amount Dd. Accordingly, the position at which the images displayed in the upper display area A are visually recognized by the driver 300 moves by the amount "Dc". As a result, the driver 300 perceives the images displayed in the upper display area A with the distance Lc.

As described above, the virtual image G is projected while controlling, based on the calculated driver's head movement amount Dd, the amount "Db" and "Dc" by which the positions at which the images displayed in the upper display area A and the middle display area B are visually recognized move. Accordingly, the driver 300 perceives the images as if the images displayed in the middle display area B (including, for example, the lane indicator image 711 and the following-distance presenting image 712) are displayed at a position further than the images displayed in the lower display area C (including, for example, the road-name display image 701, the speed limit display image 702, and the no-passing zone display image 703). Moreover, the driver 300 perceives the images as if the images displayed in the upper display area A (including, for example, the direction-change instruction images 721, 722, and 723) are displayed at a position even further than the images displayed in the middle display area B. As described above, the images on the virtual image G that are actually displayed with the same distance can be modified such that the driver 300 perceives these images with varying distances. By so doing, the depth perception of the virtual image G can be created.

In particular, in the present embodiment, the images that are displayed in the middle display area B are divided into a plurality of sections up-and-down directions, and the amount of the movement is varied for each of the sections based on the driver's head movement amount Dd. By so doing, the driver 300 perceives the images displayed in the middle display area B as if an image on the upper side is displayed with a longer distance. As described above, not only the representation using the perspective drawing but also the motion parallax are used for the lane indicator image 711 and the following-distance presenting image 712 that are displayed in the middle display area B. As a result, the depth dimension of the virtual image G can further be created.

Figure 9:
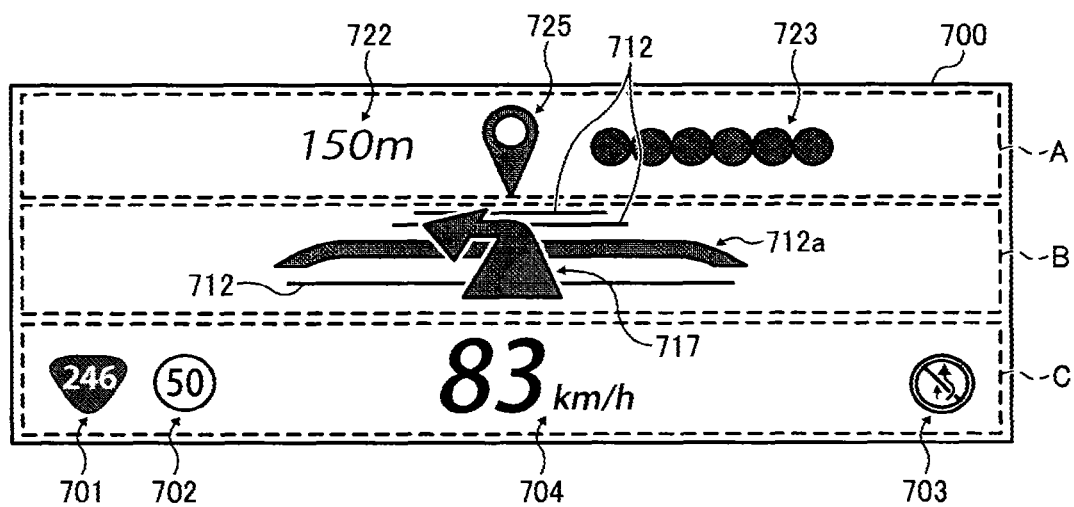
FIG. 9 is a schematic diagram illustrating an example image of the situation in which the direction is to be changed at an upcoming intersection, according to an embodiment of the present invention.

FIG. 9 is a schematic diagram illustrating an example image of the situation in which the direction is to be changed at an upcoming intersection, according to the present embodiment. When it comes to a situation in which the direction is to be changed at an upcoming intersection, the example image illustrated in FIG. 1 is switched to the example image as illustrated in FIG. 9. In other words, in place of the lane indicator image 711 displayed in the middle display area B, a path indicator image 717 that is similar to the path indicator image 721 displayed in the upper display area A of the example image illustrated in FIG. 1 is displayed in the middle display area B. This happens because a future instruction has become the upcoming instruction. Accordingly, the driver 300 can know that he/she only has to follow the path indicator image 717 displayed in the middle display area B at the next intersection or branch point.

In the example image illustrated in FIG. 9, a downward-pointing sign 725 is displayed at the position of the path indicator image 721 displayed in the upper display area A of the example image illustrated in FIG. 1. The downward-pointing sign 725 guides the line of sight of the driver 300 to the path indicator image 717 displayed in the middle display area B. Accordingly, the driver 300 can easily recognize the path indicator image 7117 displayed in the middle display area B.

Next, the control of the display of a preceding vehicle image 724 and the following-distance presenting image 712 that together provide the driver with a preceding-vehicle approaching information indicating that the following distance between the vehicle 350 and the preceding vehicle is becoming narrow is described. In the present embodiment, a distance sensor such as the object recognition device 100 and the sensor device 500 recognizes the following distance to the preceding vehicle 350. Then, the image controller 250 receives the recognition-result data that indicates the distance to an object ahead of the vehicle, and controls, based on the recognition-result data, the display position, brightness, color, shape, or the like of the preceding vehicle image 724 displayed in the upper display area A of the display area 700 or the following-distance presenting image 712 displayed in the middle display area B of the display area 700. In the present embodiment, the driver 300 can visually recognize how much the following distance to the preceding vehicle 350 is becoming narrow by the changes made to the following-distance presenting image 712 and the preceding vehicle image 724.

First Example Image

FIGS. 10A to 10E are schematic diagrams of example images where images indicating the preceding-vehicle approaching information change according to the following distance to the preceding vehicle 350, according to the present embodiment. Note that these example images illustrated in FIGS. 10A to 10E are referred to as first example images. Although the destination is not set to the vehicle navigation device 400 and no instruction image regarding the route navigation information is displayed in the first example images, the first example images illustrated in FIGS. 10A to 10E can be applied to cases in which an instruction image regarding the route navigation information is displayed.

Figure 10A:
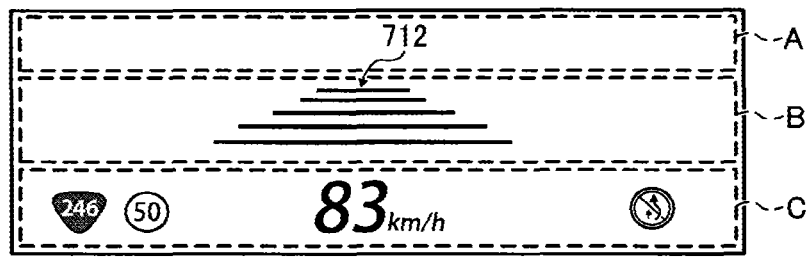
FIGS. 10A to 10E are schematic diagrams of first example images where the images indicating the preceding-vehicle approaching information change according to the following distance to the preceding vehicle, according to an embodiment of the present invention.

When the preceding vehicle 350 is not recognized in the first example images, as illustrated in FIG. 10A, the image controller 250 displays in the middle display area B the following-distance presenting image 712 that consist of five horizontal lines where the length becomes shorter and the brightness becomes lower towards the upper side. Note that in the example image illustrated in FIG. 10A, the overall brightness of the following-distance presenting image 712 is low. In this example image, no image is displayed in the upper display area A.

Figure 10B:
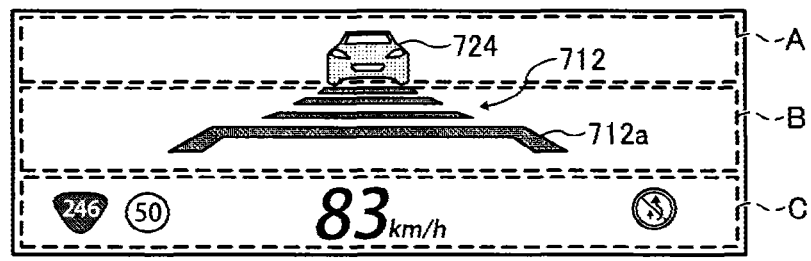

When the preceding vehicle 350 is recognized and the following distance to the preceding vehicle 350 is longer than a prescribed safe range, as illustrated in FIG. 10B, the image controller 250 increases the brightness of the following-distance presenting image 712 that is displayed in the middle display area B. Further, in the first example image, the image of the lowest horizontal line of the following-distance presenting image 712 is replaced with a vehicle bumper image 712a that is a line where the thickness is greater and the both ends of the line is extended downward and outward. The vehicle bumper image 712a recalls the front bumper of the vehicle 301 to the driver 300.

Further, in the first example image, as illustrated in FIG. 10B, the preceding vehicle image 724 with low brightness that resembles the rear view of a preceding vehicle is displayed in the upper display area A. The preceding vehicle image 724 is controlled in view of the driving parallax so as to be perceived by the driver 300 with the perception distance (Lc) same as that of the other images displayed in the upper display area A.

Figure 10C:
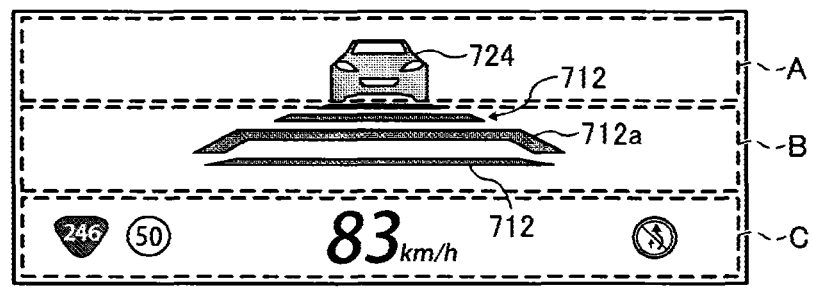

When the preceding vehicle 350 is recognized and the following distance to the preceding vehicle 350 is within the prescribed safe range, as illustrated in FIG. 10C, the image controller 250 increases the brightness of the following-distance presenting image 712 displayed in the middle display area B and the brightness of the preceding vehicle image 724 displayed in the upper display area A to a degree greater than that of the example image illustrated in FIG. 10B. Further, in the first example image, the image of the second horizontal line from the bottom of the following-distance presenting image 712 is changed to the vehicle bumper image 712a. By so doing, compared with the image illustrated in FIG. 10B, the vehicle bumper image 712a appears closer to the preceding vehicle 724. Accordingly, compared with the image illustrated in FIG. 10B, the driver 300 can know that the vehicle 301 is getting closer to the preceding vehicle 350.

Further, in the first example image, the preceding vehicle image 724 illustrated in FIG. 10C is controlled in view of the driving parallax so as to be perceived by the driver 300 with a closer perception distance Le1 (Lb<Le1<Lc) than that of the other images displayed in the upper display area A. By so doing, compared with the image illustrated in FIG. 10B, the driver perceives that the preceding vehicle image 724 is closer. Accordingly, compared with the image illustrated in FIG. 10B, the driver 300 can know that the vehicle 301 is getting closer to the preceding vehicle 350 with even stronger sensation.

Figure 10D:
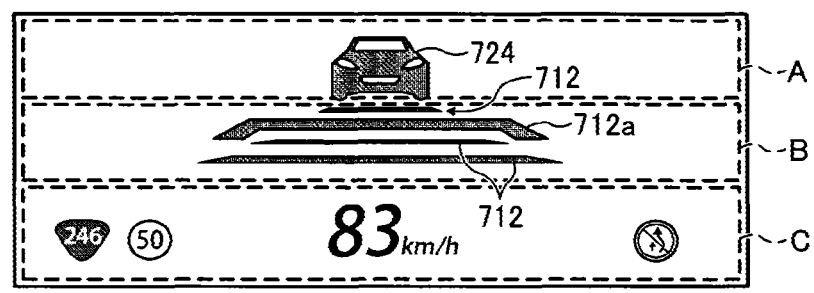

When the preceding vehicle 350 is recognized and the following distance to the preceding vehicle 350 is shorter than the prescribed safe range but longer than a prescribed braking-required distance, as illustrated in FIG. 10D, the image controller 250 increases the brightness of the following-distance presenting image 712 displayed in the middle display area B and the brightness of the preceding vehicle image 724 displayed in the upper display area A to a degree greater than that of the example image illustrated in FIG. 10C. Further, in the first example image, the image of the third horizontal line from the bottom of the following-distance presenting image 712 is changed to the vehicle bumper image 712a. By so doing, compared with the image illustrated in FIG. 10C, the vehicle bumper image 712a appears even closer to the preceding vehicle 724. Accordingly, compared with the image illustrated in FIG. 10C, the driver 300 can know that the vehicle 301 is getting even closer to the preceding vehicle 350.

Further, in the first example image, the preceding vehicle image 724 illustrated in FIG. 10D is controlled in view of the driving parallax so as to be perceived by the driver 300 with an even closer perception distance Le2 (Lb.<Le2<Le1) than that of the other images displayed in the upper display area A. By so doing, compared with the image illustrated in FIG. 10C, the driver perceives that the preceding vehicle image 724 is closer. Accordingly, compared with the image illustrated in FIG. 10C, the driver 300 can know with stronger sensation that the vehicle 301 is getting even closer to the preceding vehicle 350.

Figure 10E:
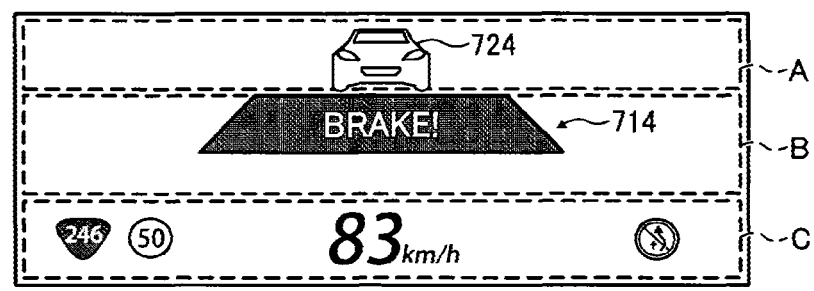

When the preceding vehicle 350 is recognized and the following distance to the preceding vehicle 350 becomes shorter and is within the range of the prescribed braking-required distance, as illustrated in FIG. 10E, the image controller 250 changes the following-distance presenting image 712 that is displayed in the middle display area B to a brake warning image 714 where the textual image "BRAKE!" in a red trapezoid-shaped box. In so doing, the visual recognizability of the preceding vehicle image 724 may be reduced by decreasing the brightness of the preceding vehicle image 724 displayed in the upper display area A or by removing the solid fill of the preceding vehicle image 724 displayed in the upper display area A. Accordingly, the brake warning image 714 stands out, which is desirable. Alternatively, the preceding vehicle image 724 displayed in the upper display area A may be hidden such that the brake warning image stands out. When the laser scanning system is adopted in the above case where the preceding vehicle image 724 displayed in the upper display area A is hidden, the light can completely be cut off at non-image areas, and the brake warning image even more stands out, increasing the warning effect.

It is to be noted that the prescribed safe range or the prescribed braking-required distance described as above may be fixed in advance, or may vary according to the vehicle speed or the like of the vehicle 301.

Second Example Image

Figure 11A:
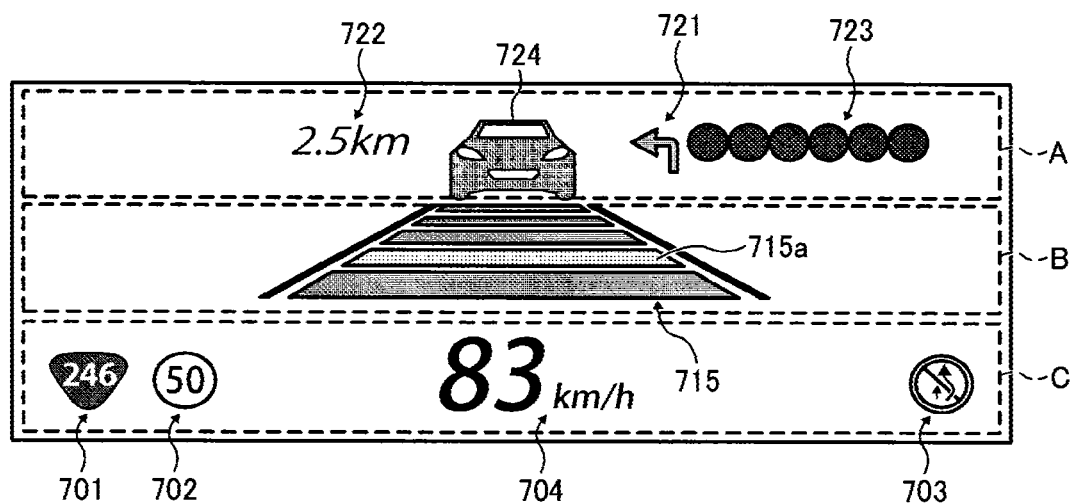
FIG. 11A and FIG. 11B are schematic diagrams of second example images where the images indicating the preceding-vehicle approaching information change according to the following distance to the preceding vehicle, according to an embodiment of the present invention.
Figure 11B:
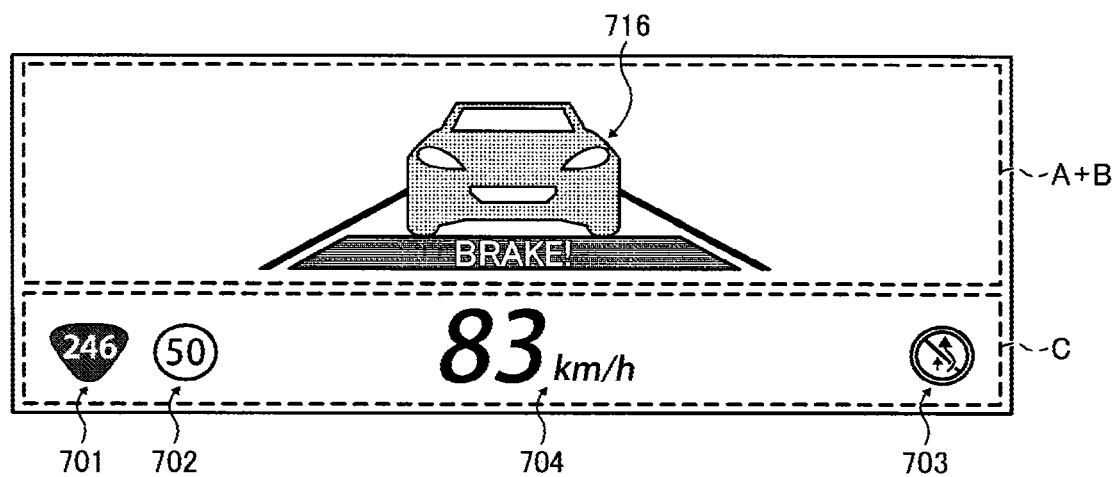

A method of making the driver 300 realize that following distance to the preceding vehicle 350 is too short is not limited to the first example images described above, but may be example images as illustrated in FIG. 11A and FIG. 11B. In the following description, these example images illustrated in FIG. 11A and FIG. 11B are referred to as second example images.

In a similar manner to the first example images illustrated in FIGS. 10A to 10E, images indicating the preceding-vehicle approaching information change according to following distance to the preceding vehicle 350 in the second example images. More specifically, in place of the five horizontal lines of the following-distance presenting image 712 of the first example images described as above, a following-distance presenting image 715 consisting of a trapezoid image drawn towards the vanishing point using the perspective drawing method is used in the second example image of FIG. 11A, and the trapezoid image of the following-distance presenting image 715 is divided into four in the up-and-down directions. In a similar manner to the first example images described above where the vehicle bumper image 712a moves upward to get close to the preceding vehicle image 724 as the distance to the preceding vehicle 350 becomes shorter, a high-brightness trapezoidal section 715 in the second example image of FIG. 11A moves upward to get close to the preceding vehicle image 724 as the distance to the preceding vehicle 350 becomes shorter. Note that the example image illustrated in FIG. 11A corresponds to the image illustrated in FIG. 10D, and the example image illustrated in FIG. 11A is an example of when the preceding vehicle 350 is recognized and the following distance to the preceding vehicle 350 is shorter than the prescribed safe range but longer than a prescribed braking-required distance.

In the second example images, the destination is set to the vehicle navigation device 400 and an instruction image regarding the route navigation information is displayed. For this reason, when the preceding vehicle 350 is not recognized, in a similar manner to the example illustrated in FIG. 1, the path indicator image 721 is displayed near the center of the upper display area A in the right and left directions (near the vanishing point), and the remaining distance indicator image 722 and the intersection or the like name indicator image 723 are displayed on right and left sides, respectively.

Given these circumstances, when the preceding vehicle 350 is recognized and the preceding vehicle image 724 is to be displayed in the upper display area A, the direction-change instruction images 721, 722, and 723 may be all hidden in the upper display area A. However, in such cases, the instruction that is indicated by the direction-change instruction images 721, 722, and 723 (i.e., instruction for future action) is not provided to the driver 300, and the driver 300 may become anxious about it.

On the other hand, when the direction-change instruction images 721, 722, and 723 that are displayed in the upper display area A are moved to a different display area to continue the display of the direction-change instruction images 721, 722, and 723, the driver may take time to search for the moved direction-change instruction images 721, 722, and 723. In such cases, the instruction that is indicated by the direction-change instruction images 721, 722, and 723 cannot appropriately be provided to the driver 300.

According to the second example images, even when the preceding vehicle image 724 is displayed in the upper display area A where the direction-change instruction images 721, 722, and 723 are displayed, the direction-change instruction images 721, 722, and 723 are continuously displayed in the upper display area A. Accordingly, even when the preceding vehicle image 724 is to be displayed in the upper display area A, the instruction that is indicated by the direction-change instruction images 721, 722, and 723 can appropriately be provided to the driver 300.

When the preceding vehicle image 724 is displayed in the upper display area A where the direction-change instruction images 721, 722, and 723 are displayed, it is not necessary for all of the direction-change instruction images 721, 722, and 723 to be continuously displayed in the upper display area A. For example, the intersection or the like name indicator image 723 may selectively be hidden.

Moreover, when the following distance to the preceding vehicle 350 gets close to the range of the prescribed braking-required distance in the second example image, as illustrated in FIG. 11B, the image controller 250 displays a brake warning image 716 that is displayed across the upper display area A and the middle display area B. The brake warning image 716 is a combination of a red image obtained by magnifying the preceding vehicle image 724 to be displayed in the upper display area A and a red image of all the trapezoidal sections of the following-distance presenting image 715 according to the second example image illustrated in FIG. 11A. What is more, in the second example image illustrated in FIG. 11B, all the direction-change instruction images 721, 722, and 723 are hidden such that the brake warning image 716 stands out.

Third Example Image

Figure 12A:
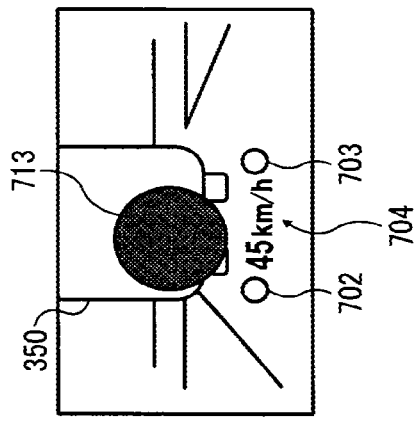
FIG. 12A, FIG. 12B, and FIG. 12C are schematic diagrams of third example images where the images indicating the preceding-vehicle approaching information change according to the following distance to the preceding vehicle, according to an embodiment of the present invention.
Figure 12B:
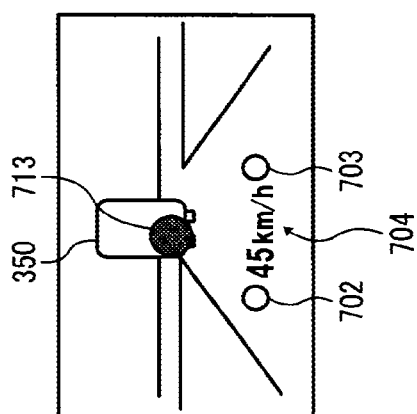
Figure 12C:
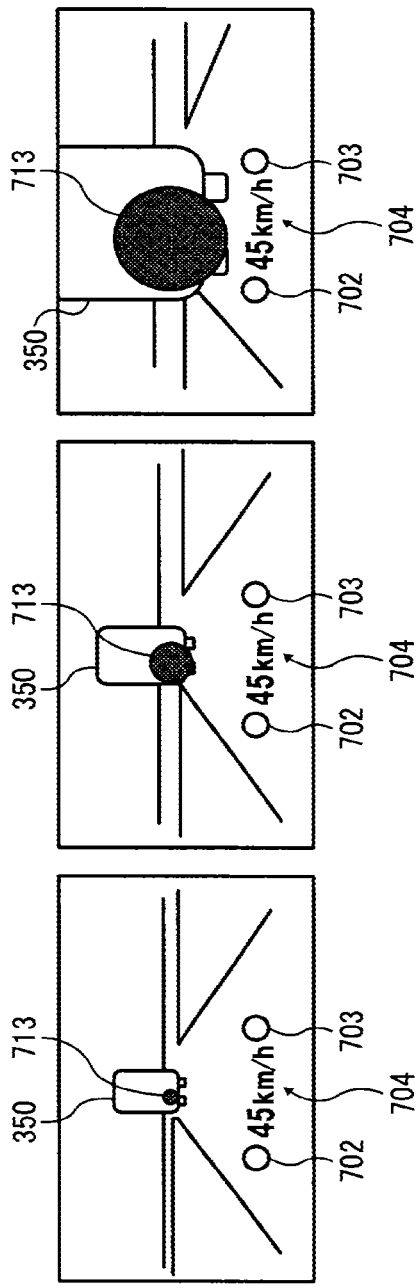

A method of making the driver 300 realize that following distance to the preceding vehicle 350 is too short may be example images as illustrated in FIG. 12A, FIG. 12B, and FIG. 12C. In the following description, these example images illustrated in FIG. 12A, FIG. 12B, and FIG. 12C are referred to as third example images. In a similar manner to the first example images and the second example images as described above, images indicating the preceding-vehicle approaching information change according to following distance to the preceding vehicle 350 in the third example images. More specifically, as an image in the third example image that indicates the preceding-vehicle approaching information, a simple figure image 713 that consists of a simple figure (a circular image in the third example images) is used in place of the following-distance presenting image 712 or the preceding vehicle image 724 that resembles the rear view of a vehicle. In the third example images, the display is controlled such that the perception distance to the simple figure image 713 becomes shorter as the distance to the preceding vehicle 350 becomes shorter.

More specifically, as illustrated in FIG. 12A, FIG. 12B, and FIG. 12C, for example, the display is controlled such that the simple figure image 713 is enlarged and the brightness of the simple figure image 713 becomes higher as the distance to the preceding vehicle 350 becomes shorter. In particular, in the third example images, the display is controlled such that the perception distance influenced by the motion parallax of the simple figure image 713 becomes shorter as the distance to the preceding vehicle 350 becomes shorter.

In other words, while the virtual image G including the simple figure image 713 is displayed with the distance of 5 m from the driver 300, when the distance to the preceding vehicle 350 is long as illustrated in FIG. 12A, the display is controlled such that the perception distance of the virtual image G becomes the same as or close to the perception distance (Lc) of display area A, for example, 10 m. More specifically, the image controller 250 shifts the position of the simple figure image 713 displayed in the middle display area B of the display area 700 of the virtual image G according to the driver's head movement amount Dd calculated from the image data captured by driver camera 150. Accordingly, the display is controlled in such a manner that the perception distance of the simple figure image 713 becomes about 10 m as described above.

In the case of FIG. 12B where the distance to the preceding vehicle 350 has become shorter than that of the FIG. 12A, the display is controlled such that the perception distance becomes shorter (for example, 7 m) than the perception distance in the case of FIG. 12A. More specifically, the image controller 250 shifts the position of the simple figure image 713 displayed in the middle display area B of the display area 700 of the virtual image G according to the driver's head movement amount Dd calculated from the image data captured by driver camera 150. Accordingly, the display is controlled in such a manner that the perception distance of the simple figure image 713 becomes about 7 m as described above.

In a similar manner, in the case of FIG. 12C where the distance to the preceding vehicle 350 has become even shorter than that of the FIG. 12B, the display is controlled such that the perception distance becomes shorter (for example, 4 m) than the perception distance in the case of FIG. 12B. More specifically, the image controller 250 shifts the position of the simple figure image 713 displayed in the middle display area B of the display area 700 of the virtual image G according to the driver's head movement amount Dd calculated from the image data captured by driver camera 150. Accordingly, the display is controlled in such a manner that the perception distance of the simple figure image 713 becomes about 4 m as described above. Note that this perception distance (4 m) is shorter than the distance of the virtual image G (5m). Such a short perception distance can also be achieved by the control of the display as described above.

Fourth Example Image

Figure 13A:
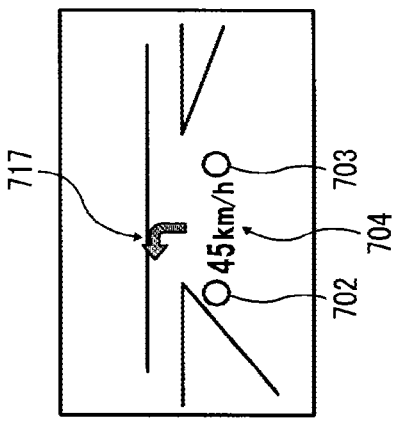
FIG. 13A, FIG. 13B, and FIG. 13C are schematic diagram illustrating fourth example images of the situation in which the direction is to be changed at an upcoming intersection, according to an embodiment of the present invention.
Figure 13B:
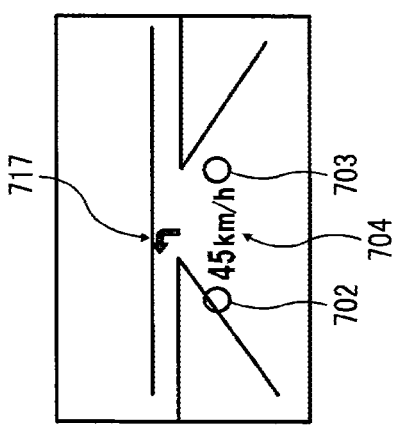
Figure 13C:
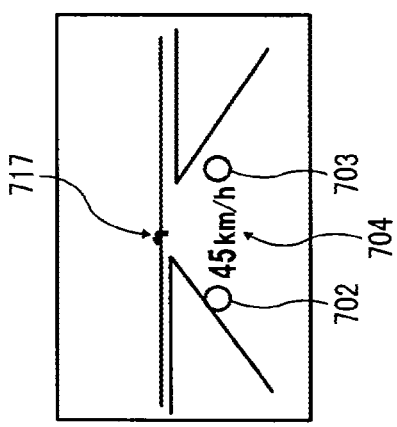

Next, another set of example images of the situation in which the direction is to be changed at an upcoming intersection is described. These example images will be referred to as fourth example images in the following description. When it comes to a situation in which the direction is to be changed at an upcoming intersection, in the embodiment described above, the example image displayed in FIG. 9 is used to provide to the driver 300 the information indicating to what direction the direction is to be changed and at what intersection the direction is to be changed. In the fourth example images, the example images illustrated in FIG. 13A, FIG. 13B, and FIG. 13C are used.

In the fourth example images, the path indicator image 717 is displayed in the display area 700 so as to overlap with the actual intersection that is visually recognized by the driver through the front windshield 302. In the example image illustrated in FIG. 9, the remaining distance information, which is passive information, that indicates the distance to the intersection or branch point where the direction change is to be made is provided to the driver 300 using the remaining distance indicator image 722. The remaining distance indicator image 722 indicates the remaining distance with the image of the numerical value. By contrast, in the fourth example images, the perception distance of the path indicator image 717 is changed according to the remaining distance information. By so doing, the remaining distance information indicating the distance to the intersection or branch point where the direction change is to be made is provided to the driver 300 by changing perception distance of the path indicator image 717.

More specifically, the image controller 250 shifts the position of the path indicator image 717 displayed in the middle display area B of the display area 700 of the virtual image G according to the driver's head movement amount Dd calculated from the image data captured by driver camera 150. By so doing, the display is controlled in such a manner that the perception distance of the path indicator image 717 matches the actual distance to the intersection. The actual distance to the intersection may be obtained, for example, from the vehicle navigation device 400.

It is to be noted that the perception distance of the path indicator image 717 does not necessarily have to match the actual distance to the intersection. It is intended that the driver will recognize the actual distance to the intersection is getting short as the perception distance of the path indicator image 717 is gradually narrowed.

Fifth Example Image

Figure 14:
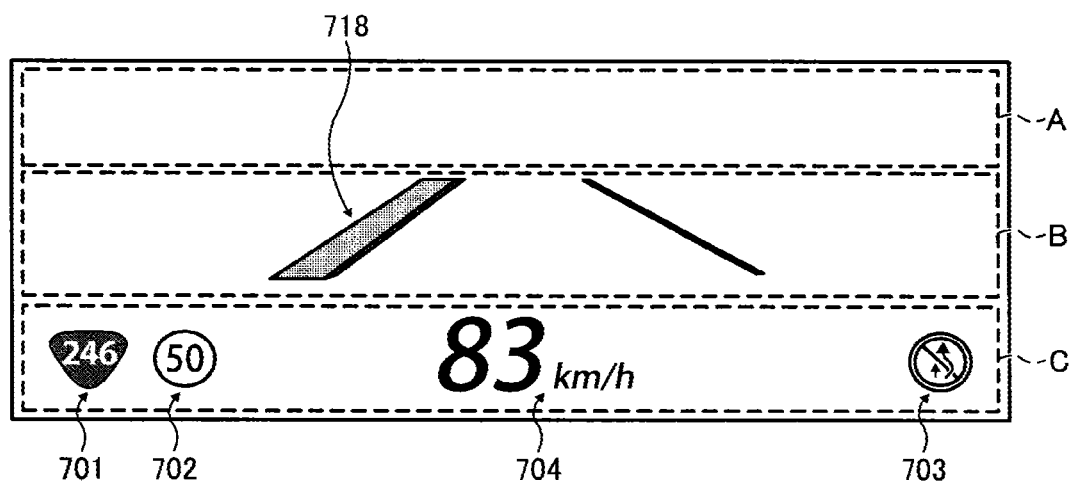
FIG. 14 is a schematic diagram of a fifth example image where a school-commuting-route warning image is displayed in the middle display area when the road on which the vehicle is traveling is a school commuting route, according to an embodiment of the present invention.

Alternatively, information whose provision is particularly desired by the driver 300 may be displayed in the middle display area B as a warning image. Such information is the information relating to the road on which the vehicle 301 is traveling, including the information relating to the road closed to vehicles or the information relating to the restricted or designated road. For example, as illustrated in the example image of FIG. 14, a school-commuting-route warning image 718 that indicates that the road on which the vehicle 301 is traveling is a school commuting route is displayed in the middle display area B. This example image will be referred to as a fifth example image in the following description. More specifically, the image controller 250 obtains road-specific information of the road on which the vehicle 301 is traveling from the various kinds of data or the like output from the vehicle navigation device 400. Then, when the obtained road-specific information is the information to be displayed in the middle display area B, the image controller 250 displays in the middle display area B a warning image that corresponds to the obtained road-specific information.

As described above, the middle display area B is an area in which an instruction image indicating the instruction to be dealt with prior to the other multiple instructions is displayed. For this reason, when such a warning image is displayed in the middle display area B as in the fifth example image, the driver can recognize through intuition that the road on which the vehicle 301 is currently traveling may be closed, restricted, or designated as specified by the warning image.

Sixth Example Image

Figure 15:
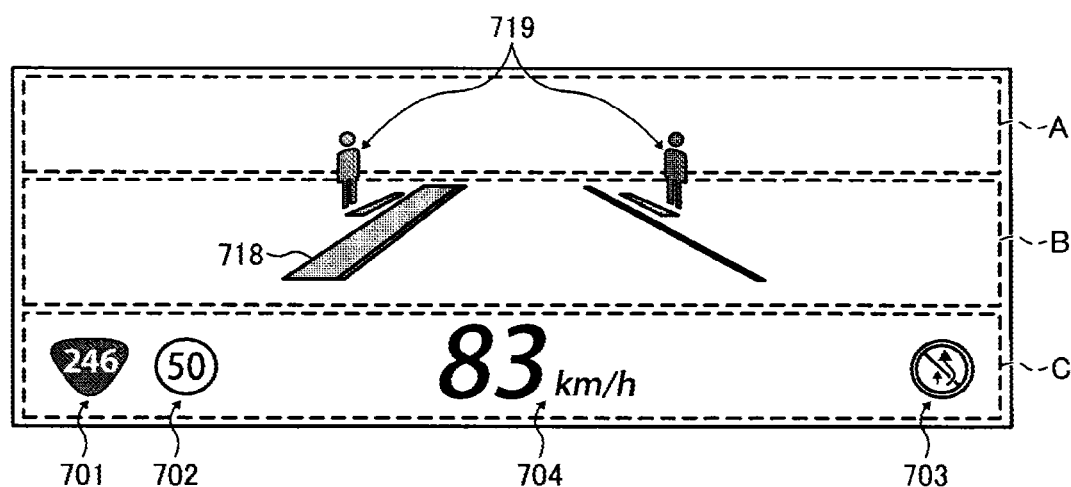
FIG. 15 is a schematic diagram of a sixth example image where a human-shaped warning image is displayed in the middle display area when a person who is about to cross a pedestrian crossing in the direction of travel of the vehicle is detected, according to an embodiment of the present invention.

When a person is detected who is about to cross a pedestrian crossing in the direction of travel of the vehicle 301, the warning image of such a detection may be displayed in the middle display area B. One reason for this configuration is that a person is one of the objects that require the greatest attention for vehicles, and that a person is an entity to be dealt with immediately. For example, a human-shaped warning image 719 is displayed in the middle display area B as in the example image illustrated in FIG. 15. This example image will be referred to as a sixth example image in the following description. More specifically, the image controller 250 uses the object recognition device 100 and the sensor device 500 to recognize a person ahead of the vehicle. Then, the image controller 250 receives the recognition-result data that indicates the distance to the person ahead of the vehicle, and displays the human-shaped warning image 719 in the middle display area B based on the received recognition-result data. Note also that the school-commuting-route warning image 718, which is described as above with reference to the fifth example image, is displayed together in the sixth example image. When the information provision device according to the present embodiment is provided for mobile objects other than vehicles, such as for a ship, other ships or the like around the ship may be displayed in place of a person.

The embodiments described above are given as an example, and advantageous effects are achieved for each of the following modes A to L.

<Mode A>

An information provision device such as the on-vehicle HUD 200 includes an image-light projection device such as the HUD 230 configured to project an image light to a light transmission member such as the front windshield 302 so as to display a for-driver information image indicating for-driver information to be provided for a driver 300 of a mobile object such as the vehicle 301 in a prescribed display area 700 that is visually recognized by the driver 300 through the light transmission member ahead of the mobile object in a direction of travel. Moreover, the information provision device includes a distance sensor such as the object recognition device 100 configured to detect a relative distance of an object to be detected such as the preceding vehicle 350 existing around the mobile object in the direction of travel, a viewpoint detector such as the driver camera 150 configured to detect a location of a viewpoint of the driver, and a display controller such as the image controller 250 configured to control the image-light projection device by changing a position at which an object image such as the preceding vehicle image 724 indicating the object to be detected is displayed according to a result of detection generated by the viewpoint detector so as to change a perception distance of the driver influenced by a motion parallax of the object image according to the relative distance of the object to be detected in the direction of travel detected by the distance sensor.

It is beneficial to use an image-light projection device to project an image to provide to the driver with the relative movement information of an object existing around the mobile object (environmental object information). For example, situations in which it is difficult for the driver to visually recognize an object around the mobile object due to poor visibility around the mobile object are considered. If an object-representing image corresponding to the object is displayed using a HUD and the environmental object information is provided to the driver, he or she can drive safely. Even when it is not difficult for the driver to visually recognize an object around the vehicle, the provision of the environmental object information indicating the motion of an object that could be overlooked due to the carelessness or the like of the driver can help the driver drive safe. When the environmental object information is to be provided to the driver in such a way, it is effective to make the driver perceive the object-representing image in such a manner that the depth dimension changes according to the relative movement with reference to the mobile object. By so doing, the driver can easily recognize the environmental object information. Moreover, the application of a motion parallax is effective in making the driver perceive the environmental object information in the above manner. According to the present mode, the perception distance of the object image that is displayed in a prescribed display area ahead of the mobile object in the direction of travel can be varied according to the relative distance in the direction of travel between the mobile object and the object to be detected existing around the mobile object (relative distance in the direction of travel of the mobile object). In the present mode, the driver is made to perceive the perception distance of the object image with a motion parallax. Accordingly, it becomes easy to make the driver recognize the environmental object information including the motion of the object to be detected approaching or moving away from the mobile object.

<Mode B>

In the Mode A, the object to be detected is another mobile object such as the preceding vehicle 350 traveling ahead of the mobile object. In this mode, it becomes easy to make the driver 300 to recognize the information that the distance to another preceding mobile object is getting short such as the preceding-vehicle approaching information.

<Mode C>

An information provision device such as the on-vehicle HUD 200 includes an image-light projection device such as the HUD 230 configured to project an image light to a light transmission member such as the front windshield 302 so as to display a for-driver information image indicating for-driver information to be provided for a driver 300 of a mobile object such as the vehicle 301 in a prescribed display area 700 that is visually recognized by the driver 300 through the light transmission member ahead of the mobile object in a direction of travel. The prescribed display area 700 includes an active-information image display area such as the lower display area C that continues displaying an active-information image such as the road-name display image 701, the speed limit display image 702, the no-passing zone display image 703, and the vehicle speed display image 704 indicating active information such as road-specific information and vehicle-speed information to be actively recognized by the driver, and a passive-information image display area such as the upper display area A and the middle display area B that temporarily displays, at a timing when a prescribed information provision condition is met, a passive-information image such as the lane indicator image 711, the direction-change instruction images 721, 722, and 723, the following-distance presenting image 712, and the preceding vehicle image 724 indicating passive information such as route navigation information and preceding-vehicle approaching information to be passively recognized by the driver. Moreover, the information provision device includes a viewpoint detector such as the driver camera 150 configured to detect a location of a viewpoint of the driver, and a display controller such as the image controller 250 configured to control the image-light projection device by changing a position at which the passive-information image is displayed in the passive-information image display area according to a result of detection generated by the viewpoint detector so as to make a perception distance Lb or Lc of the driver influenced by the motion parallax of the passive-information image become longer than a perception distance La of the driver of the active-information image displayed in the active-information image display area.

Usually, while the driver is driving, he or she observes a point at infinity ahead of the mobile object through the light transmission member, or observes another preceding mobile object a few tens of meters ahead of the vehicle. For such a driver whose focus is on such a remote point, an image that is displayed at a more distant point is easier to recognize or notice. This is because a difference in focal length is smaller between the observation point and such a distant point. Here, the passive information that is passively recognized by a driver is the information to be provided to the driver at the timing determined by the information provision device, and is the information whose provision timing has a certain relation with the detail of the information. For this reason, the passive-information image that indicates the passive information is to be recognized by the driver 300 as soon as the passive-information image is displayed.

On the other hand, the active information to be actively recognized by the driver is the information to be provided to the driver only when he or she wishes. The active information includes information where the timing of its provision has low or no relevance to the detail of the information. As the active information is obtained by the driver at the timing when he or she wishes, the active information is usually displayed for a long time or displayed continuously.

In the present mode, the driver perceives the active-information image and the passive-information image as if the passive-information image is displayed further than the active-information image due to a motion parallax. For this reason, it is easier for the driver to recognize the passive-information image than the active-information image because the driver focuses on a remote point when he or she is driving. Accordingly, the driver can easily notice a newly-displayed passive-information image even when an active-information image is displayed prior to the passive-information image. Accordingly, the driver 300 can easily recognize the passive-information image as soon as it is displayed, and the passive information can be provided to the driver without delay.

Note that it is more difficult for the driver to recognize the active-information image than the passive-information image because the active-information image is perceived as if the active-information image is displayed with a shorter distance than the passive-information image and the driver focuses on a remote point when he or she is driving. However, the driver 300 has willingness to obtain the active information, and thus the less visibility of the active-information image than the passive-information image does not cause a problem in the provision of the active information. As the active information is usually displayed for a long time or displayed continuously as described above, in fact, high visibility of the active-information image may distract the attention of the driver who is driving, which is disadvantageous.

<Mode D>

In the Mode C, the passive information includes a plurality of pieces of instruction information indicating varying instructions to the driver of the mobile object, and the display controller controls the image-light projection device so as to display one or a plurality of instruction images corresponding to the instruction information such as the lane indicator image 711 and the direction-change instruction images 721, 722, and 723 with a lower priority for the driver in an operational sequence is displayed on an upper side of the passive-information image display area, The driver usually has both a sense of distance that an object existing ahead of the moving mobile object gets close to the current position as the time passes by, and a sense of time that a future event gets close to the current time as the time passes by. Further, an object existing ahead of the moving mobile object reaches the mobile object in a shorter time as the distance between the object and the mobile object is shorter, and it takes a longer time for the object existing ahead of the moving mobile object to reach the position of the mobile object as the distance between the object and the mobile object is longer. For these reasons, an object that is ahead of the mobile object and is far away from the moving mobile object has a high affinity of recognition for a far future event, and an object that is ahead of the mobile object and is close to the moving mobile object has a high affinity of recognition for a nearer future event.

In the present mode, the display of a plurality of instruction images with varying operational sequences is controlled in view of such an affinity such that an instruction image with a lower priority for the driver in the operational sequence is displayed on an upper side of the prescribed display area. By so doing, the sequence of operation of the instructions that are indicated by these instruction images can be recognized by the driver through intuition, and the situation can be avoided in which the driver confuses among the operational sequences of the instruction indicated by the instruction images.

<Mode E>

In the Mode D, the image-light projection device projects an image light onto the light transmission member so as to display the passive-information image display area on a lower side of a sight visually recognized by the driver through the light transmission member ahead of the mobile object in the direction of travel.

The driver 300 who visually recognizes through the light transmission member the sight ahead of the mobile object in the direction of travel usually drives while observing near the center in the vertical direction of the sight ahead of the mobile object as an observation point. In the present mode, the prescribed display area 700 in which a plurality of instruction images are displayed is positioned on a lower side of the sight ahead of the mobile object. As a result, a plurality of instruction images are displayed under the observation point of the driver in the vertical direction. In the sight where these instruction images overlap under the observation point of the driver, an object that is far away from the mobile object is visually recognized on an upper side of the sight in the vertical direction, and an object that is close to the mobile object is visually recognized on a lower side of the sight in the vertical direction. Accordingly, the position at which an object is visually recognized in the sight is gradually displaced towards the downside as the mobile object travels forward and gets close to the object.

When a plurality of instruction images are displayed in an overlapping manner in the sight, as in the present mode, the display of a plurality of instruction images with varying operational sequences is controlled such that an instruction image with a lower priority for the driver in the operational sequence is displayed on an upper side of the prescribed display area. Accordingly, the situation in which the driver confuses among the operational sequences of the instruction indicated by the instruction images can be minimized. This is because, in view of the affinity of recognition as described above, an instruction image of far future (i e, an instruction image with a lower priority in the operational sequence) can be displayed so as to overlap with a position where an object that is far away from the moving mobile object ahead of the mobile object is visually recognized, and an instruction image of near future (i.e., an instruction image with a high priority in the operational sequence) can be displayed so as to overlap with a position where an object that is close to the moving mobile object ahead of the mobile object is visually recognized. By so doing, the sequence of operation of the instructions that are indicated by these instruction images can be recognized by the driver through intuition. On the contrary, when the prescribed display area 700 is positioned on a lower side of the sight ahead of the mobile object and if the position at which the instruction images are displayed are, for example, rearranged horizontally or inverted up-and-down direction with reference to the present embodiment, it becomes difficult for the driver to recognize the operational sequence through intuition as the driver is disturbed by the sense of distance or the sense of time as described above.

<Mode F>

In the Mode D or Mode E, the instruction images indicate instructions to be dealt with by the driver at varying points (e.g., the upcoming intersection, and the next intersection or branch point where the direction is to be changed from the straight-ahead direction) of on a route the mobile object takes. Accordingly, the situation can be avoided in which the driver confuses among the instructions with varying operational sequences indicated by the route navigation information.

<Mode G>

In any of one of the Modes A to F, the image-light projection device projects the image light to display the instruction image as a virtual image in the prescribed display area, and distance between a driver and the virtual image is equal to or longer than 5 m.

When the distance to the virtual image G is about 2 m and the driver attempts to adjust the focal point of the eyes on the virtual image G, the convergence motion of the eyes are usually required. As described above, the convergence motion is a major factor in achieving the desired sense of distance or depth perception to an object to be visually recognized. If the convergence motion occurs to the eyes to focus on the virtual image G when the display is controlled as above, the sense of distance (change in perception distance) or the depth perception (difference in perception distance), which are expected to be brought by a motion parallax, cannot be perceived as desired. When the distance to the virtual image G is equal to or greater than 5 m as in the Mode G, the driver can focus on the virtual image G with almost no convergence motion in the eyes. Accordingly, the sense of distance (change in perception distance) or the depth perception (difference in perception distance), which are expected to be brought by motion parallax, can be perceived as desired in absence of the convergence motion of the eyes.

<Mode H>

In any one of the modes A to G, the image-light projection device includes a light emitter such as the light source unit 220 configured to emit an image light according to image data of the instruction image, and an optical scanner such as the optical scanner 208 configured to scan the image light emitted from the light emitter two-dimensionally, and the image-light projection device projects the image light two-dimensionally scanned by the optical scanner to the light transmission member to display the for-driver information image in the prescribed display area.

As described above, according to the present mode, it is easier to display a virtual image G with a wide dimension and high brightness than the systems with, for example, the LCD and the VFD. Moreover, according to the present mode, the light that irradiates the non-image area of the display area on which the virtual image G is displayed can be completely shut by preventing the light emitter from emitting an image light. For this reason, if a laser scanning system is adopted as in the Mode H, the non-image area does not disturb the visual recognizability of the sight ahead of the mobile object as the light emitter that may irradiate the non-image area can be completely shut.

<Mode I>

A method of providing information includes projecting an image light to a light transmission member so as to display a for-driver information image indicating for-driver information to be provided for a driver of a mobile object in a prescribed display area that is visually recognized by the driver through the light transmission member ahead of the mobile object in a direction of travel, thereby providing the for-driver information to the driver. Moreover, the method of providing information includes sensing a relative distance of an object to be detected existing around the mobile object in the direction of travel, detecting a location of a viewpoint of the driver, and changing a position at which an object image indicating the object to be detected is displayed according to a result of the detecting so as to change a perception distance of the driver influenced by a motion parallax of the object image according to the relative distance of the object to be detected in the direction of travel detected by the sensing.

According to the present mode, the driver is made to perceive the perception distance of the object image with a motion parallax. Accordingly, it becomes easy to make the driver recognize the environmental object information including the motion of the object to be detected approaching or moving away from the mobile object.

<Mode J>

A computer-readable non-transitory recording medium stores a program for causing a computer of an information provision device to execute an information-provision control method. The information provision device includes an image-light projection device configured to project an image light to a light transmission member so as to display a for-driver information image indicating for-driver information to be provided for a driver of a mobile object in a prescribed display area that is visually recognized by the driver through the light transmission member ahead of the mobile object in a direction of travel, a distance sensor configured to sense a relative distance of an object to be detected existing around the mobile object in the direction of travel, and a viewpoint detector configured to detect a location of a viewpoint of the driver. The information-provision control method includes controlling the image-light projection device by changing a position at which an object image indicating the object to be detected is displayed according to a result of detection generated by the viewpoint detector so as to change a perception distance of the driver influenced by a motion parallax of the object image according to the relative distance of the object to be detected in the direction of travel detected by the distance sensor.

According to the present mode, the driver is made to perceive the perception distance of the object image with a motion parallax. Accordingly, it becomes easy to make the driver recognize the environmental object information including the motion of the object to be detected approaching or moving away from the mobile object.

<Mode K>

A method of providing information includes projecting an image light to a light transmission member so as to display a for-driver information image indicating for-driver information to be provided for a driver of a mobile object in a prescribed display area that is visually recognized by the driver through the light transmission member ahead of the mobile object in a direction of travel, thereby providing the for-driver information to the driver. The prescribed display area includes an active-information image display area that continues displaying an active-information image indicating active information to be actively recognized by the driver, and a passive-information image display area that temporarily displays, at a timing when a prescribed information provision condition is met, a passive-information image indicating passive information to be passively recognized by the driver. Moreover, the method of providing information includes detecting a location of a viewpoint of the driver, by changing a position at which the passive-information image is displayed in the passive-information image display area according to a result of the detecting, and controlling the projecting so as to make a perception distance of the driver influenced by the motion parallax of the passive-information image become longer than a perception distance of the driver of the active-information image displayed in the active-information image display area.

According to the present mode, it becomes easier for the driver to recognize the passive-information image than the active-information image because the driver focuses on a remote point when he or she is driving. Accordingly, the driver can easily notice a newly-displayed passive-information image even when an active-information image is displayed prior to the passive-information image. Accordingly, the driver 300 can easily recognize the passive-information image as soon as it is displayed, and the passive information can be provided to the driver without delay.

<Mode L>

A computer-readable non-transitory recording medium stores a program for causing a computer of an information provision device to execute an information-provision control method. The information provision device includes an image-light projection device configured to project an image light to a light transmission member so as to display a for-driver information image indicating for-driver information to be provided for a driver of a mobile object in a prescribed display area that is visually recognized by the driver through the light transmission member ahead of the mobile object in a direction of travel, and a viewpoint detector configured to detect a location of a viewpoint of the driver. The prescribed display area includes an active-information image display area that continues displaying an active-information image indicating active information to be actively recognized by the driver, and a passive-information image display area that temporarily displays, at a timing when a prescribed information provision condition is met, a passive-information image indicating passive information to be passively recognized by the driver. The information-provision control method includes controlling the image-light projection device by changing a position at which the passive-information image is displayed in the passive-information image display area according to a result of detection generated by the viewpoint detector so as to make a perception distance of the driver influenced by the motion parallax of the passive-information image become longer than a perception distance of the driver of the active-information image displayed in the active-information image display area.

According to the present mode, it becomes easier for the driver to recognize the passive-information image than the active-information image because the driver focuses on a remote point when he or she is driving. Accordingly, the driver can easily notice a newly-displayed passive-information image even when an active-information image is displayed prior to the passive-information image. Accordingly, the driver 300 can easily recognize the passive-information image as soon as it is displayed, and the passive information can be provided to the driver without delay.

Note that the programs mentioned above may be distributed or made available in a state being recorded on recording medium such as a compact disc read only memory (CD-ROM). Alternatively, the programs may be distributed or made available by distributing or receiving the signal, which carries the program and is transmitted from a certain transmitter, through a transmission medium such as public telephone lines, a private line, and other sorts of network. In such distribution, the transmission medium may carry only a part of the computer program. In other words, it is not necessary for all the data that makes up the computer program to exist in a transmission medium at one time. The above-mentioned signal that carries a program is a computer data signal that is implemented in a prescribed carrier including a computer program. A method of transmitting a computer program from a certain transmitter includes cases in which the data that makes up the program is continuously transmitted and cases in which the data that makes up the program is intermittently transmitted.

Numerous additional modifications and variations are possible in light of the above teachings. It is therefore to be understood that within the scope of the appended claims, the disclosure of the present invention may be practiced otherwise than as specifically described herein. For example, elements and/or features of different illustrative embodiments may be combined with each other and/or substituted for each other within the scope of this disclosure and appended claims.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, non-volatile memory cards, ROM, etc. Alternatively, any one of the above-described and other methods of the present invention may be implemented by ASICs, prepared by interconnecting an appropriate network of conventional component circuits, or by a combination thereof with one or more conventional general-purpose microprocessors and/or signal processors programmed accordingly.

What is claimed is:
1. An image display device, comprising:
a location detector configured to detect a change, in a given direction, of a location of a viewpoint of a driver when driving a mobile object;
a projector configured to project, to a first display area, an active-information image that is actively recognized by the driver and includes a speed of the mobile object, and project, to a second display area, a passive-information mage that is projected and recognized by the driver, when a prescribed information provision condition is met, the active-information image and the passive-information image being visible to the driver through a light transmission member, wherein the second display area is above the first display area when viewed from the viewpoint of the driver, and the passive-information image includes passive information used by the driver to drive the mobile object; and a controller configured to, based on the detected change of the location of the viewpoint of the driver, shift, in a reverse direction of the given direction, a position at which the passive-information image is projected in the second display area by a second amount that is different from a first amount by which a position at which the active-information image is projected is shifted in the reverse direction, so as to change a depth perception distance of the passive-information image relative to a depth perception distance of the active-information image.

2. The image display device according to claim 1, wherein the controller is further configured to control the depth perception distance of the passive-information image for the driver to be longer than the depth perception distance of the active-information image for the driver.

3. The image display device according to claim 1, further comprising circuitry configured to obtain distance information indicating a distance between the mobile object and an object existing in a peripheral area of the mobile object,
wherein the passive-information image is projected at a position corresponding to the object existing in the peripheral area of the mobile object.

4. The image display device according to claim 3, wherein the controller is further configured to control the depth perception distance of the passive-information image to become shorter when a relative distance between the mobile object and the object existing in the peripheral area of the mobile object gets shorter.

5. The image display device according to claim 3, wherein the object is another mobile object traveling forward, ahead of the mobile object.

6. The image display device according to claim 5, wherein the passive-information image displayed in the second display area is an image indicating the distance to the another mobile object.

7. The image display device according to claim 1, wherein the location of the viewpoint of the driver is at a location of an eye of the driver.

8. The image display device according to claim 1, wherein the location of the viewpoint of the driver is at a location of a head of the driver.

9. The image display device of claim 1, wherein the controller is further configured to control a size of a particular object in the passive-information image so as to change the depth perception distance of the passive-information image.

10. The image display device of claim 1, wherein the projector is configured to project the passive-information image, which includes route navigation information.

11. The image display device of claim 1, wherein the controller is configured to shift the second display area by the second amount and shift the first display area by the first amount, which is larger than the second amount.

12. A mobile object, comprising:
a light transmission member through which a driver views outside the mobile object;
a location detector configured to detect a change, in a given direction, of a location of a viewpoint of the driver when driving the mobile object; and
a display configured to display, in a first display area, an active-information image that is actively recognized by the driver and includes a speed of the mobile object, and, in a second display area, a passive-information image that is displayed and recognized by the driver, when a prescribed information provision condition is met, the active-information image and the passive-information image being visible to the driver through the light transmission member, wherein the second display area is above the first display area when viewed from the viewpoint of the driver, and the passive-information image includes passive information used by the driver to drive the mobile object,
wherein the display is further configured to, based on the detected change of the location of the viewpoint of the driver, shift, in a reverse direction of the given direction, a position at which the passive-information image is displayed in the second display area by a second amount that is different from a first amount by which a position at which the active-information image is displayed is shifted in the reverse direction, so as to change a depth perception distance of the passive-information image relative to a depth perception distance of the active-information image.

13. A method of displaying an image, the method comprising:
detecting a change, in a given direction, of a location of a viewpoint of a driver when driving a mobile object;
displaying, in a first display area, an active-information image that is actively recognized by the driver and includes a speed of the mobile object, and, in a second display area, a passive-information image that is displayed and recognized by the driver when a prescribed information provision condition is met, the active-information image and the passive-information image being visible to the driver through a light transmission member, wherein the second display area is above the first display area when viewed from the viewpoint of the driver, and the passive-information image includes passive information used by the driver to drive the mobile object; and
based on the detected change of the location of the viewpoint of the driver, shift, in a reverse direction of the given direction, a position at which the passive-information image is displayed in the second display area by a second amount that is different from a first amount by which a position at which the active-information image is displayed is shifted in the reverse direction, so as to change a depth perception distance of the passive-information image relative to a depth perception distance of the active-information image for the driver.

14. A non-transitory computer-readable recording medium storing a program for causing a computer to execute a method, the method comprising:
detecting a change, in a given direction, of a location of a viewpoint of a driver when driving a mobile object;
displaying, in a first display area, an active-information image that is actively recognized by the driver and includes a speed of the mobile object, and, in a second display area, a passive-information image that is displayed and recognized by the driver, when a prescribed information provision condition is met, the active-information image and the passive-information image being visible to the driver through a light transmission member, wherein the second display area is above the first display area when viewed from the viewpoint of the driver, and the passive-information image includes passive information used by the driver to drive the mobile object; and
based on the detected change of the location of the viewpoint of the driver, shift, in a reverse direction of the given direction, a position at which the passive-information image is displayed in the second display area by a second amount that is different from a first amount by which a position at which the active-information image is displayed is shifted in the reverse direction, so as to change a depth perception distance of the passive-information image relative to a depth perception distance of the active-information image.

* * * * *